(12) United States Patent
Nishida et al.

(10) Patent No.: US 12,314,659 B2
(45) Date of Patent: *May 27, 2025

(54) ANSWER GENERATING DEVICE, ANSWER LEARNING DEVICE, ANSWER GENERATING METHOD, AND ANSWER GENERATING PROGRAM

(71) Applicant: NIPPON TELEGRAPH AND TELEPHONE CORPORATION, Tokyo (JP)

(72) Inventors: Kosuke Nishida, Tokyo (JP); Atsushi Otsuka, Tokyo (JP); Kyosuke Nishida, Tokyo (JP); Hisako Asano, Tokyo (JP); Junji Tomita, Tokyo (JP); Itsumi Saito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 455 days.

This patent is subject to a terminal disclaimer.

(21) Appl. No.: 17/433,096

(22) PCT Filed: Dec. 17, 2019

(86) PCT No.: PCT/JP2019/049385
§ 371 (c)(1),
(2) Date: Aug. 23, 2021

(87) PCT Pub. No.: WO2020/174826
PCT Pub. Date: Sep. 3, 2020

(65) Prior Publication Data
US 2022/0043972 A1    Feb. 10, 2022

(30) Foreign Application Priority Data
Feb. 25, 2019   (JP) .................................. 2019-032127

(51) Int. Cl.
*G06F 40/20*   (2020.01)
*G06F 40/151*  (2020.01)

(52) U.S. Cl.
CPC ............ *G06F 40/20* (2020.01); *G06F 40/151* (2020.01)

(58) Field of Classification Search
CPC .. G06F 40/30; G06F 16/3329; G06F 16/3344; G06F 40/20; G06F 40/151;
(Continued)

(56) References Cited

U.S. PATENT DOCUMENTS 8,666,983 B2 *   3/2014   Brill .................... G06F 16/3329
                                                     707/736
10,496,928 B2 * 12/2019   Oh ........................ G06N 5/041
(Continued)

OTHER PUBLICATIONS

Seo et al. (2017) "Bi-Directional Attention Flow for Machine Comprehension", Published as a conference paper at ICLR, Feb. 24, 2017.
(Continued)

*Primary Examiner* — Abdelali Serrou

(57) ABSTRACT

An encoding unit transforms a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text. For each of the spans, an evidence extraction unit estimates an evidence score indicating the degree to which the span is suitable as the evidence for extracting the answer using a pre-trained extraction model for calculating the evidence score based on the vector representation sequence.

4 Claims, 13 Drawing Sheets

(58) Field of Classification Search
CPC ........... G06F 16/3347; G06F 16/90332; G06F 40/126; G06F 16/245; G06F 40/216; G06F 16/5846; G06F 16/3334; G06F 40/35; G06F 18/22; G06F 18/214; G06F 40/279; G06F 16/90; G06F 16/243; G06F 16/355

See application file for complete search history.

(56) References Cited

U.S. PATENT DOCUMENTS

| | | | | |
|---|---|---|---|---|
| 10,726,206 | B2* | 7/2020 | Sigal | G06F 40/216 |
| 10,762,438 | B1* | 9/2020 | Zhang | G06F 40/30 |
| 11,227,218 | B2* | 1/2022 | Min | G06F 40/30 |
| 2019/0042892 | A1* | 2/2019 | Wolf | G06F 18/241 |

OTHER PUBLICATIONS

Rajpurkar et al. (2016) "SQuAD: 100,000+ Questions for Machine Comprehension of Text", Computer Science Department Stanford University, Oct. 11, 2016.

Nguyen et al. (2016) "MS MARCO: A Human Generated MAchine Reading COmprehension Dataset," 30th Conference on Neural Information Processing Systems (NIPS 2016), Barcelona, Spain.

Tan et al. (2017) "S-NET: From Answer Extraction To Answer Generation for Machine Reading Comprehension".

Kim et al. (2016) "Character-Aware Neural Language Models", arXiv:1508.06615.

Chen et al. (2017) "Enhanced LSTM for Natural Language Inference", arXiv:1609.06038.

Vinyals et al. (2016) "Order matters: Sequence to sequence for sets", ICLR.

See et al. (2017) "Get to the point: ummarization with pointer-generator networks", ACL, pp. 1073-1083.

Chen et al. (2018) "Fast abstractive summarization with reinforce-selected sentence rewriting", ACL, pp. 675-686.

Yang et al. (2018) "HotpotQA: A dataset for diverse, explainable multi-hop question answering", EMNLP, pp. 2369-2380.

Devlin et al. (2019) "BERT: Pre-training of Deep Bidirectional Transformers for Language Understanding" Proceedings of NAACL-HLT, Minneapolis, Minnesota, Jun. 2-Jun. 7, 2019, pp. 4171-4186 [on-line] https://www.aclweb.org/anthology/N19-1423/.

* cited by examiner

ANSWER GENERATING DEVICE, ANSWER LEARNING DEVICE, ANSWER GENERATING METHOD, AND ANSWER GENERATING PROGRAM

CROSS-REFERENCE TO RELATED APPLICATIONS

This application is a U.S. 371 Application of International Patent Application No. PCT/JP2019/049385, filed on 17 Dec. 2019, which application claims priority to and the benefit of JP Application No. 2019-032127, filed on 25 Feb. 2019, the disclosures of which are hereby incorporated herein by reference in their entireties.

TECHNICAL FIELD

The present disclosure relates to an answer generation apparatus, an answer learning apparatus, an answer generation method, and an answer generation program, and more particularly to an answer generation apparatus, an answer learning apparatus, an answer generation method, and an answer generation program for answering a question with polarity.

BACKGROUND ART

In recent years, a machine reading comprehension technology (for example, BiDAF (Non Patent Literature 1)) in which a machine reads a piece of text and answers a question has attracted attention. Typical datasets for machine reading comprehension include SQuAD (Non Patent Literature 2) which enables application of a large-scale deep learning technique.

SQuAD is a dataset for extractive-type tasks in which a piece of text of one paragraph is linked to one question and an answer written in the piece of text is extracted as it is and used as an answer.

CITATION LIST

Non Patent Literature

Non Patent Literature 1: Minjoon Seo, Aniruddha Kembhavi, Ali Farhadi, Hananneh Hajishirzi, "BI-DIRECTIONAL ATTENTION FLOW FOR MACHINE COMPREHENSION," Published as a conference paper at ICLR, 2017.
Non Patent Literature 2: Pranav Rajpurkar, Jian Zhang, Konstantin Lopyrev, Percy Liang, "SQuAD: 100,000+ Questions for Machine Comprehension of Text," Computer Science Department Stanford University, 2016.

SUMMARY OF THE INVENTION

Technical Problem

However, the technique for extractive-type tasks has a problem that an answer cannot be output in a format not written in the text. Specifically, a question that can be answered with polarity such as yes or no cannot be answered with that polarity (yes or no). To output an answer in such a format not written in the text, it is necessary for the machine not only to pay attention to a part of the piece of text related to the question but also to classify the answer to the question from the related part.

The present disclosure has been made in view of the above points and it is an object of the present disclosure to provide an answer generation apparatus, an answer generation method, and an answer generation program that can answer a question that can be answered with polarity accurately and with polarity.

The present disclosure has been made in view of the above points and it is another object of the present disclosure to provide an answer learning apparatus that can learn a model for answering a question that can be answered with polarity accurately and with polarity.

Means for Solving the Problem

A first aspect of the present disclosure provides an answer generation apparatus including an encoding unit configured to transform a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text, an evidence extraction unit configured to estimate evidence information that is a span suitable as evidence for extracting the answer using a pre-trained extraction model that extracts the span suitable as the evidence for extracting the answer based on the vector representation sequence, an evidence search unit configured to estimate an evidence range that is a range serving as evidence for the answer in the piece of text using a pre-trained search model that extracts the evidence range based on the vector representation sequence and the evidence information, and a classification unit configured to classify an answer type for the question using a pre-trained classification model that classifies an answer type which is a correct answer corresponding to the answer to the question in the piece of text based on the vector representation sequence and the evidence information.

A second aspect of the present disclosure provides an answer generation apparatus including an encoding unit configured to transform a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text, and an evidence extraction unit configured to estimate, for each of the spans, an evidence score indicating a degree to which the span is suitable as evidence for extracting the answer using a pre-trained extraction model for calculating the evidence score based on the vector representation sequence, wherein the pre-trained encoding model and the pre-trained extraction model are pre-trained through multitask learning of a plurality of models including encoding and extraction models and further including a search model that extracts an evidence range that is a range serving as a evidence for the answer in the piece of text based on the vector representation sequence produced through transformation using the encoding model, and a classification model that classifies an answer type which is a correct answer corresponding to the answer to the question in the piece of text based on the vector representation sequence.

A third aspect of the present disclosure provides an answer learning apparatus including an input unit configured to receive an input of training data including a piece of text divided into a plurality of spans that are subdivided units of the piece of text, a question, an answer type which is a correct answer corresponding to an answer to the question in the piece of text, an evidence range that is a range serving as evidence for the answer in the piece of text, and evidence information that is a span serving as a evidence for the answer in the piece of text, an encoding unit configured to transform the piece of text divided into the plurality of spans and the question into a vector representation sequence representing a meaning of a span and the question using an encoding model for transforming input text into a vector representation sequence representing a meaning of the input text, an evidence extraction unit configured to estimate the evidence information using an extraction model that extracts the evidence information based on the vector representation sequence, an evidence search unit configured to estimate the evidence range using a search model that extracts the evidence range based on the vector representation sequence and the evidence information in the training data, an classification unit configured to classify an answer type for the question using a classification model that classifies the answer type for the question based on the vector representation sequence and the evidence information in the training data, and a parameter learning unit configured to learn parameters of the encoding model, the extraction model, the search model, and the classification model such that the evidence information extracted by the evidence extraction unit and the evidence information in the training data match, the evidence range estimated by the evidence search unit and the evidence range in the training data match, and the answer type classified by the classification unit and the answer type in the training data match.

A fourth aspect of the present disclosure provides an answer generation method including transforming, an encoding unit, a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text, estimating, an evidence extraction unit, evidence information that is a span suitable as evidence for extracting the answer using a pre-trained extraction model that extracts the span suitable as the evidence for extracting the answer based on the vector representation sequence, estimating, an evidence search unit, an evidence range that is a range serving as evidence for the answer in the piece of text using a pre-trained search model that extracts the evidence range based on the vector representation sequence and the evidence information, and determining, a classification unit, an answer type for the question using a pre-trained classification model that classifies an answer type which is a correct answer corresponding to the answer to the question in the piece of text based on the vector representation sequence and the evidence information.

A fifth aspect of the present disclosure provides an answer generation method including transforming, by an encoding unit, a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text, and estimating, an evidence extraction unit, for each of the spans, an evidence score indicating a degree to which the span is suitable as evidence for extracting the answer using a pre-trained extraction model for calculating the evidence score based on the vector representation sequence, wherein the pre-trained encoding model and the pre-trained extraction model are pre-trained through multitask learning of a plurality of models including encoding and extraction models and further including a search model that extracts an evidence range that is a range serving as evidence for the answer in the piece of text based on the vector representation sequence produced through transformation using the encoding model, and a classification model that classifies an answer type which is a correct answer corresponding to the answer to the question in the piece of text based on the vector representation sequence.

A sixth aspect of the present disclosure provides an answer generation program for causing a computer to execute processing of transforming a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text, estimating evidence information that is a span suitable as evidence for extracting the answer using a pre-trained extraction model that extracts the span suitable as the evidence for extracting the answer based on the vector representation sequence, estimating an evidence range that is a range serving as a evidence for the answer in the piece of text using a pre-trained search model that extracts the evidence range based on the vector representation sequence and the evidence information, and determining an answer type for the question using a pre-trained classification model that classifies an answer type which is a correct answer corresponding to the answer to the question in the piece of text based on the vector representation sequence and the evidence information.

A seventh aspect of the present disclosure provides an answer generation program for causing a computer to execute processing of transforming a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text, and estimating, for each of the spans, an evidence score indicating a degree to which the span is suitable as evidence for extracting the answer using a pre-trained extraction model for calculating the evidence score based on the vector representation sequence, wherein the pre-trained encoding model and the pre-trained extraction model are pre-trained through multitask learning of a plurality of models including encoding and extraction models and further including a search model that extracts an evidence range that is a range serving as evidence for the answer in the piece of text based on the vector representation sequence produced through transformation using the encoding model, and a classification model that classifies an answer type which is a correct answer corresponding to the answer to the question in the piece of text based on the vector representation sequence.

Effects of the Invention

The answer generation apparatus, the answer generation method, and the program of the present disclosure can answer a question that can be answered by polarity accurately and with polarity.

Further, the answer learning apparatus of the present disclosure can learn a model for answering a question that can be answered with polarity accurately and with polarity.

DESCRIPTION OF EMBODIMENTS

Figure 1:
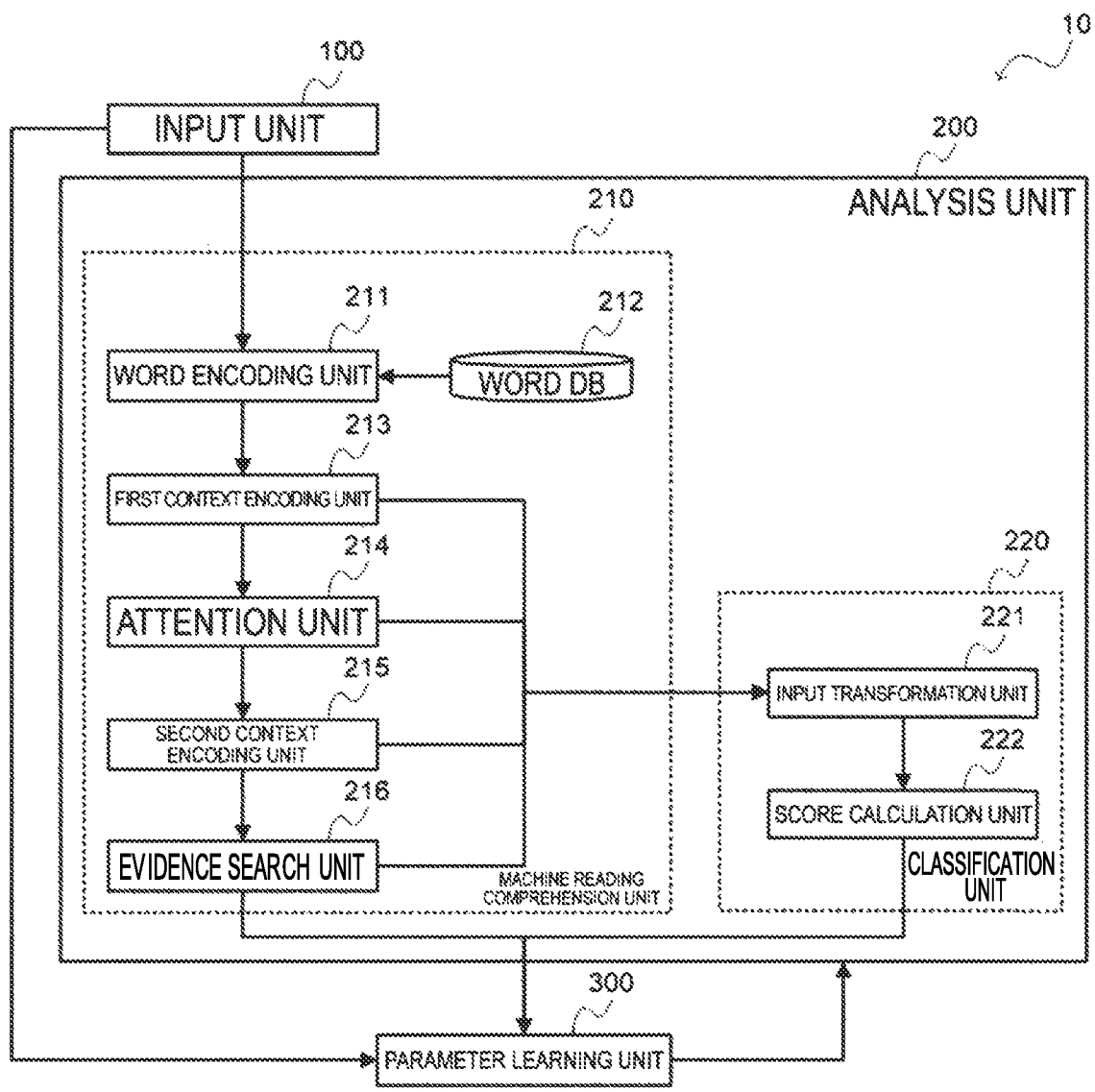
FIG. 1 is a functional block diagram illustrating a configuration of an answer learning apparatus according to a first embodiment.

Hereinafter, embodiments of the present disclosure will be described with reference to the drawings.

Outline of Answer Learning Apparatus According to First Embodiment

A first embodiment proposes performing a task of "answering a question, which can be answered with polarity such as yes or no, with polarity such as yes or no" upon receiving an input question. This has been newly set as a task of outputting an answer in a format not written in text. The present embodiment will be described with reference to the case where the polarity of the answer is yes or no as an example.

The task of answering yes or no is a completely new task for which there is no existing research.

Typical datasets for machine reading comprehension include MS-MARCO (Reference 1) in addition to SQuAD (Non Patent Literature 2). MS-MARCO is a dataset in which nearly 10 paragraphs are linked to each question and humans generate an answer from the paragraphs. A task of outputting an answer to a question in a format not written in a piece of text is called a generative-type task.

[Reference 1] Tri Nguyen, Mir Rosenberg, Xia Song, Jianfeng Gao, Saurabh Tiwary, Rangan Majumder, Li Deng, "MS MARCO: A Human Generated MAchine Reading COmprehension Dataset," 2016.

While there are two types of tasks, extractive and generative types, most of the existing machine reading comprehension techniques are those in which extractive-type tasks are set.

The generative-type task is a more difficult task than the extractive-type task because of the characteristics of "outputting an answer in a format not written in text."

Because the generative-type task uses a dataset in which correct answers are those that humans have generated from scratch, the machine also needs to create an answer from scratch. Methods for generative-type tasks include S-Net (Reference 2).

[Reference 2] Chuanqi Tan, Furu Weiz, Nan Yang, Bowen Du, Weifeng Lv, Ming Zhouz, "S-NET: FROM ANSWER EXTRACTION TO ANSWER GENERATION FOR MACHINE READING COMPREHENSION," 2017.

In general question answering, there are many situations of having to answer with yes or no. However, when a generative-type technique such as that of Reference 2 is applied to such a situation, the possibility of generating yes or no as an answer is included but that possibility is very low, and the machine cannot answer correctly.

The present embodiment proposes a method specialized for the task of "answering a question, which can be answered with yes or no, with yes or no," such that it is possible to correctly answer in a situation where an answer of yes or no should be given. This can greatly expand the range in which the machine can answer questions.

The answer learning apparatus according to the present embodiment learns using an answer range score and a classification score which are described below. Here, the answer learning apparatus first transforms a piece of text P and a question Q which are word sequences into vector sequences through a machine reading comprehension unit using a reading comprehension technique and then transforms the vector sequences into the answer range score $(s_d; s_e)$. Using the vector sequences and the answer range score, the answer learning apparatus transforms the piece of text P and the question Q into the classification score through a classification unit which is a new technique.

That is, rather than performing simple binary classification of yes and no (performing classification through machine learning using feature amounts from the entirety of the piece of text P without other considerations), the answer learning apparatus identifies a location where an answer to the question Q is written using a machine reading comprehension technology and makes a yes or no classification based on the identified location.

Here, because neural networks of the machine reading comprehension unit and the classification unit share layers, the answer learning apparatus can learn parameters from two aspects, machine reading comprehension suited to the yes or no classification and a yes or no classification based on reading comprehension.

Configuration of Answer Learning Apparatus According to First Embodiment

A configuration of the answer learning apparatus 10 according to the first embodiment will be described with reference to FIG. 1. FIG. 1 is a block diagram illustrating the configuration of the answer learning apparatus 10 according to the first embodiment.

The answer learning apparatus 10 is constructed by a computer including a CPU, a RAM, and a ROM storing a program for executing an answer learning processing routine that will be described later. The answer learning apparatus 10 according to the present embodiment functionally includes an input unit 100, an analysis unit 200, and a parameter learning unit 300 as illustrated in FIG. 1.

The input unit 100 receives inputs of a plurality of pieces of training data, each including a piece of text P, a question Q, a correct answer Y indicating the polarity of an answer to the question in the piece of text P, and a start D and an end E of a range which serves as evidence for the answer in the piece of text P.

Specifically, each piece of training data includes a piece of text P and a question Q which include text data, a correct answer Y indicating whether the answer is yes or no, and a range (D:E) which serves as evidence for the answer in the piece of text P. Here, D and E are represented by the position numbers of words in the piece of text P, D is the position number of a word at the start position of the range which serves as the evidence for the answer, and E is the position number of a word at the end position of the range which serves as the evidence for the answer.

The piece of text P and the question Q, which are text data, are each expressed as a token sequence by an existing tokenizer. In the present embodiment, a token is expressed as a word, although any unit can be used as a token.

The length of each of the piece of text P and the question Q which are represented by word sequences is defined by the number of words. Here, the number of words of the piece of text P will be denoted by $L_P$ and the number of words of the question Q will be denoted by $L_Q$.

The input unit 100 may handle a plurality of pieces of training data collectively in mini-batches on a per mini-batch evidence or may handle them on a per "piece of training data" evidence.

Then, the input unit 100 passes the piece of text P and the question Q included the received piece of training data to the machine reading comprehension unit 210 and passes the piece of training data to the parameter learning unit 300.

The analysis unit 200 includes a machine reading comprehension unit 210 and a classification unit 220.

The machine reading comprehension unit 210 estimates a start $s_d$ and an end $s_e$ of a range D:E which serves as evidence for the answer in the piece of text P using a reading comprehension model for estimating the range D:E based on the piece of text P and the question Q.

Specifically, the machine reading comprehension unit 210 includes a word encoding unit 211, a word database (DB) 212, a first context encoding unit 213, an attention unit 214, a second context encoding unit 215, and an evidence search unit 216.

The word encoding unit 211 generates word vector sequences $P_1$ and $Q_1$ based on the piece of text P and the question Q.

Specifically, the word encoding unit 211 extracts vectors corresponding to words in the piece of text P and the question Q from the word DB 212 and generates word vector sequences $P_1$ and $Q_1$.

Assuming that the dimensionality of vectors stored in the word DB 212 is d, the word vector sequence $P_1$ is a matrix of size $L_P \times d$ and the word vector sequence $Q_1$ is a matrix of size $L_Q \times d$.

Then, the word encoding unit 211 passes the generated word vector sequences $P_1$ and $Q_1$ to the first context encoding unit 213.

A plurality of word vectors are stored in the word DB 212. The word vectors are a set of real-value vectors of predetermined dimensionality representing words.

Specifically, the word DB 212 uses a plurality of word vectors (word embeddings) pre-trained using a neural network. These word vectors may include existing ones such as word2vec and GloVe. The word vectors may also include word vectors extracted from a plurality of existing word vectors with newly trained word vectors connected to the extracted word vectors. Any word embedding technique such as a technique for encoding character information of words (Reference 3) can be used. Word vectors can also be trained through gradients that can be calculated by a back-propagation method.

[Reference 3] Yoon Kim, Yacine Jernite, David Sontag, Alexander M. Rush, "Character-Aware Neural Language Models," arXiv: 1508.06615, 2016.

The first context encoding unit 213 transforms the word vector sequences $P_1$ and $Q_1$ generated by the word encoding unit 211 into vector sequences $P_2$ and $Q_2$, respectively, using a neural network.

Specifically, the first context encoding unit 213 transforms the word vector sequences $P_1$ and $Q_1$ into vector sequences $P_2$ and $Q_2$ using an RNN. The first context encoding unit 213 can use an existing technique such as LSTM for the structure of the RNN.

In the present embodiment, the first context encoding unit 213 uses a bidirectional RNN that combines two types of RNNs, an RNN that processes sequences of vectors in a forward direction and an RNN that processes sequences in a reverse direction. Assuming that the dimensionality of vectors output by the bidirectional RNN is $d_1$, the vector sequence $P_2$ produced through transformation of the first context encoding unit 213 is a matrix of size $L_P \times d_1$ and the vector sequence $Q_2$ is a matrix of size $L_Q \times d_1$.

Then, the first context encoding unit 213 passes the transformed vector sequences $P_2$ and $Q_2$ to the attention unit 214 and passes the vector sequence $Q_2$ to the input transformation unit 221.

Using a neural network, the attention unit 214 generates a reading comprehension matrix B, which is a sequence of vectors representing the attentions between the piece of text P and the question Q, based on the vector sequences $P_2$ and $Q_2$.

Specifically, the attention unit 214 first calculates an attention matrix $$A \in \mathbb{R}^{L_P \times L_Q}$$

from the vector sequences $P_2$ and $Q_2$. The attention matrix A may be given, for example, by the following equation (1).

[Math. 1]

$$A_{ij} = [P_{2,i:}, Q_{2,j:}, P_{2,i:} \circ Q_{2,j:}] w_S \qquad (1)$$

In the above equation (1), the subscripts of the matrix represent its elements and ":" represents the entirety. For example, $A_{i:}$ represents the entirety of a row i of the attention matrix A. Further, in the above equation (1). "∘" is element-wise multiplication, and "," is an operator that concatenates vectors or matrices column-wise, wS is a trainable parameter(s) of the model and $W_s \in \mathbb{R}^{Bd_1}$ Based on the attention matrix A, the attention unit 214 calculates an attention vector
$\tilde{Q}$
in the direction from the piece of text P to the question Q and an attention vector
$\tilde{p}$
in the direction from the question Q to the piece of text P.

Here, the attention vector
$\tilde{Q}$
can be represented by the following equation (2).

[Math. 2]

$$\alpha_i = \text{softmax}(A_{i:}) \in \mathbb{R}^{L_Q}$$
$$\tilde{Q}_{i:} = \sum_j \alpha_{i,j} Q_{2,j:} \in \mathbb{R}^{d_1} \quad (2)$$

softmax is a softmax function and
$\tilde{Q} \in \mathbb{R}^{L_P \times d_1}$

The attention vector
$\tilde{p}$
can be represented by the following equation (3).

[Math. 3]

$$\beta = \text{softmax}_i\left(\max_j A_{ij}\right) \in \mathbb{R}^{L_P}$$
$$\tilde{p} = \sum_i \beta_i P_{2,i:} \in \mathbb{R}^{d_1} \quad (3)$$

Here, $$\max_j A_{ij}$$

is an $L_P$-dimensional vector and its i-th element ($1 \le i \le L_P$) is a maximum value (a maximum value over j) in the i-th vector of the attention matrix A, $\text{softmax}_i$ indicates that softmax is applied over i.

β is obtained as an $L_P$-long vector by applying a max function to the attention matrix A, and in equation (3),
$\tilde{p}$
is obtained as a $d_1$-long vector by calculating a weighted sum of the rows of $P_2$ using the components of β as weights.
$\tilde{p}^T$
is repeatedly calculated $L_P$ times and arranged vertically to obtain a matrix
$\tilde{P} \in \mathbb{R}^{L_P \times d_1}$ The attention unit 214 obtains an $L_P$-long reading comprehension matrix B expressing the attention results based on the vector sequence $P_2$, the attention vectors
$\tilde{p}$,
and the attention vectors
$\tilde{Q}$.
The reading comprehension matrix is, for example, $$B = [P_2, \tilde{Q}, P_2 \circ \tilde{Q}, P_2 \circ \tilde{P}] \in \mathbb{R}^{L_P \times 4d_1},$$

where "," is an operator that concatenates vectors or matrices horizontally.

Then, the attention unit 214 passes the reading comprehension matrix B to the input transformation unit 221 and the second context encoding unit 215.

The second context encoding unit 215 transforms the reading comprehension matrix B generated by the attention unit 214 into a reading comprehension matrix M, which is a sequence of vectors, using a neural network.

Specifically, the second context encoding unit 215 transforms the reading comprehension matrix B into the reading comprehension matrix M using an RNN. The second context encoding unit 215 can use an existing technique such as LSTM for the structure of the RNN, similar to the first context encoding unit 213.

Assuming that the dimensionality of word vectors output by the RNN of the second context encoding unit 215 is $d_2$, the reading comprehension matrix is such that $$M \in \mathbb{R}^{L_P \times d_2}$$

Then, the second context encoding unit 215 passes the transformed reading comprehension matrix M to the input transformation unit 221 and the evidence search unit 216.

The evidence search unit 216 estimates the start $s_d$ and the end $s_e$ of a range D:E which serves as evidence for the answer in the piece of text P using a reading comprehension model for estimating the range D:E based on the reading comprehension matrix M.

Specifically, the evidence search unit 216 has two neural networks, a start RNN for estimating the start $s_d$ of the range which serves as evidence for the answer and an end RNN for estimating the end $s_e$.

The evidence search unit 216 first inputs the reading comprehension matrix M into the start RNN to obtain a vector sequence $M_1$.

The evidence search unit 216 obtains the start $s_d$ of the range which serves as evidence for the answer using the following equation (4).

[Math. 4]

$$s_d = \text{softmax}([B, M_1] w_1) \in \mathbb{R}^{L_P} \quad (4)$$

Here, the start $s_d$ is a score regarding the start of the range which serves as evidence for the answer and is represented by a vector. That is, the start sd represents the probability (score) that a word corresponding to each dimension of the vector is the start of the answer range.

Similarly, the evidence search unit 216 inputs the reading comprehension matrix M into the end RNN to obtain word vectors $M_2$.

The evidence search unit 216 obtains the end $s_e$ of the range which serves as evidence for the answer using the following equation (5).

[Math. 5]

$$s_e = \text{softmax}([B, M_2] w_2) \in \mathbb{R}^{L_P} \quad (5)$$

Here, the end $s_e$ is a score regarding the end of the range which serves as evidence for the answer and is represented by a vector. That is, the end $s_e$ represents the probability (score) that a word corresponding to each dimension of the vector is the end of the answer range.

The estimated start $s_d$ and end $s_e$ will be collectively referred to as an answer range score. In the above equations (4) and (5), $w_1$ and $w_2$ are parameters of the reading comprehension model represented by equations (4) and (5) and are updated by the parameter learning unit 300.

Then, the evidence search unit 216 passes the estimated answer range score to the input transformation unit 221 and the parameter learning unit 300.

The classification unit 220 classifies the polarity of the answer to the question Q using a classification model that classifies whether the polarity of the answer to the question Q is positive or negative based on information obtained through processing of the machine reading comprehension unit 210.

Specifically, the classification unit 220 includes an input transformation unit 221 and a score calculation unit 222.

The input transformation unit 221 generates vector sequences $P_3$ and $Q_3$ based on the result of encoding the piece of text P by the machine reading comprehension unit 210 and the result of encoding the question Q by the machine reading comprehension unit 210.

Specifically, the input transformation unit 221 first receives information obtained through processing of the machine reading comprehension unit 210 as an input.

Information received as an input can be classified into four types. That is, the first is a vector sequence of length $L_P$ considering the question Q (for example, the reading comprehension matrix B or M) which is the result of encoding of the piece of text P (1). The second is a vector sequence of length $L_Q$ (for example, the vector sequence $Q_2$) which is the result of encoding of the question Q (2). The third is a vector of length $L_P$ (for example, the estimated start $s_d$ and end $s_e$) which is information regarding the answer range (3). The fourth is a matrix of size $L_P \times L_Q$ (for example, the attention matrix A) which is the result of semantic matching between the piece of text P and the question Q (4). The input transformation unit 221 receives these four types.

Here, it is not always necessary to receive all four types of the information, and provision of one type (1) (the reading comprehension matrix B or M) as a minimum component can achieve the object of the present embodiment. Only one or two or more of (2), (3) and (4) may be additionally received. The present embodiment will be described with reference to the case where (1) the reading comprehension matrix B and (2) the vector sequence $Q_2$ are received as a simple form as an example.

The input transformation unit 221 calculates a vector sequence of length $L_P$ $$P_3 \in \mathbb{R}^{L_P \times d_3}$$

and a vector sequence of length $L_Q$ $$Q_3 \in \mathbb{R}^{L_Q \times d_3}$$

based on the received reading comprehension matrix B and vector sequence $Q_2$.

Any neural network can be used as a method for calculating the vector sequences $P_3$ and $Q_3$. For example, the following equations (6) and (7) can be used.

$$P_3 = RNN(B) \tag{6}$$

$$Q_3 = Q_2 \tag{7}$$

The number of dimensions $d_3$ can be set arbitrarily. When equations (6) and (7) are used, the number of dimensions $d_3$ is set such that $d_3 = d_2$ in order to match the dimensionality with that of $Q_2$ and the dimensionality of the output of the RNN in equation (6) is also such that $d_3 = d_2$.

Then, the input transformation unit 221 passes the generated vector sequences $P_3$ and $Q_3$ to the score calculation unit 222.

The score calculation unit 222 classifies the polarity of the answer to the question Q using the classification model that classifies whether the polarity of the answer to the question Q is positive or negative.

Specifically, the score calculation unit 222 obtains a classification score k (a real number from 0 to 1) which is used to classify the answer to the question Q as yes or no based on the vector sequences $P_3$ and $Q_3$ using an arbitrary framework for sentence pair classification tasks.

For example, a framework subsequent to a decoder LSTM of an ESIM (in Reference 4) which is a typical model of entailment recognition that is one of the sentence pair classification tasks can be used for the classification problem.

[Reference 4] Qian Chen, Xiaodan Zhu, Zhenhua Ling, Si Wei, Hui Jiang, Diana Inkpen, "Enhanced LSTM for Natural Language Inference," arXiv: 1609.06038, 2017.

In this case, the vector sequences $P_3$ and $Q_3$ are subjected to average pooling (an operation of taking an average in each column) or max pooling (an operation of taking a maximum value in each column) to obtain vectors $$P_a, Q_a, P_m, Q_m \in \mathbb{R}^{d_3}$$

The score calculation unit 222 concatenates the obtained vectors $P_a$, $Q_a$, $P_m$, and $Q_m$ to obtain a $4d_3$-dimensional vector J. The vector J is transformed into a real number (a one-dimensional vector) using a multi-layer perceptron and then subjected to sigmoid transformation to obtain a classification score k.

The score calculation unit 222 may be configured to implement classification into three, yes, no, or unknown, instead of the yes or no classification problem. In this case, the vector J may be transformed into a three-dimensional vector using a multi-layer perceptron and then subjected to softmax transformation to obtain the classification score k.

Then, the score calculation unit 222 passes the classification score k to the parameter learning unit 300.

The parameter learning unit 300 learns parameters of the reading comprehension model and the classification model such that the correct answer Y included in the piece of training data and the classification result of the classification unit 220 match and the start D and the end E included in the piece of training data and the start $s_d$ and the end $s_e$ estimated by the machine reading comprehension unit 210 match.

Specifically, the parameter learning unit 300 uses a linear sum of an objective function $L_C$ for the reading comprehension model used by the machine reading comprehension unit 210 and an objective function $L_J$ for the classification model used by the classification unit 220 as an objective function of the optimization problem (as in the following equation (8)).

[Math. 7]

$$L_C + \lambda L_J \tag{8}$$

Here, $\lambda$ is a parameter of the model and can be learned by a learner. When the value of $\lambda$ is set in advance, it is set to an appropriate value such as 1 or ½ such that learning proceeds.

An objective function of any machine reading comprehension technique can be used as the objective function $L_C$. For example, Non Patent Literature 1 proposes a cross-entropy function represented by the following equation (9).

[Math. 8]

$$L_C = \log s_{d,D} + \log s_{e,E} \tag{9}$$

In this equation (9), D and E represent the positions of the true start D and end E, respectively, $s_{d,D}$ represents the value of a Dth element in the vector $s_d$, and $s_{e,E}$ represents the value of an Eth element in the vector $s_e$.

Any objective function can be used as the objective function $L_J$. For example, when a cross-entropy function is used, it is represented by the following equation (10).

[Math. 9]

$$L_J = \log k_Y \qquad (10)$$

In this equation (10), Y is the correct answer Y indicating the polarity of the true answer, and score $k_{Yes}=k$ when the correct answer Y is yes, and score $k_{No}=1-k$ when the correct answer Y is no. That is, $L_J=\log(k)$ when the correct answer Y is yes and $L_J=\log(1-k)$ when the correct answer Y is no.

Then, the parameter learning unit 300 calculates the gradient of the objective function represented by the above equation (8) using an error backpropagation gradient method and updates the parameters using an arbitrary optimization method.

Operation of Answer Learning Apparatus
According to First Embodiment

Figure 2:
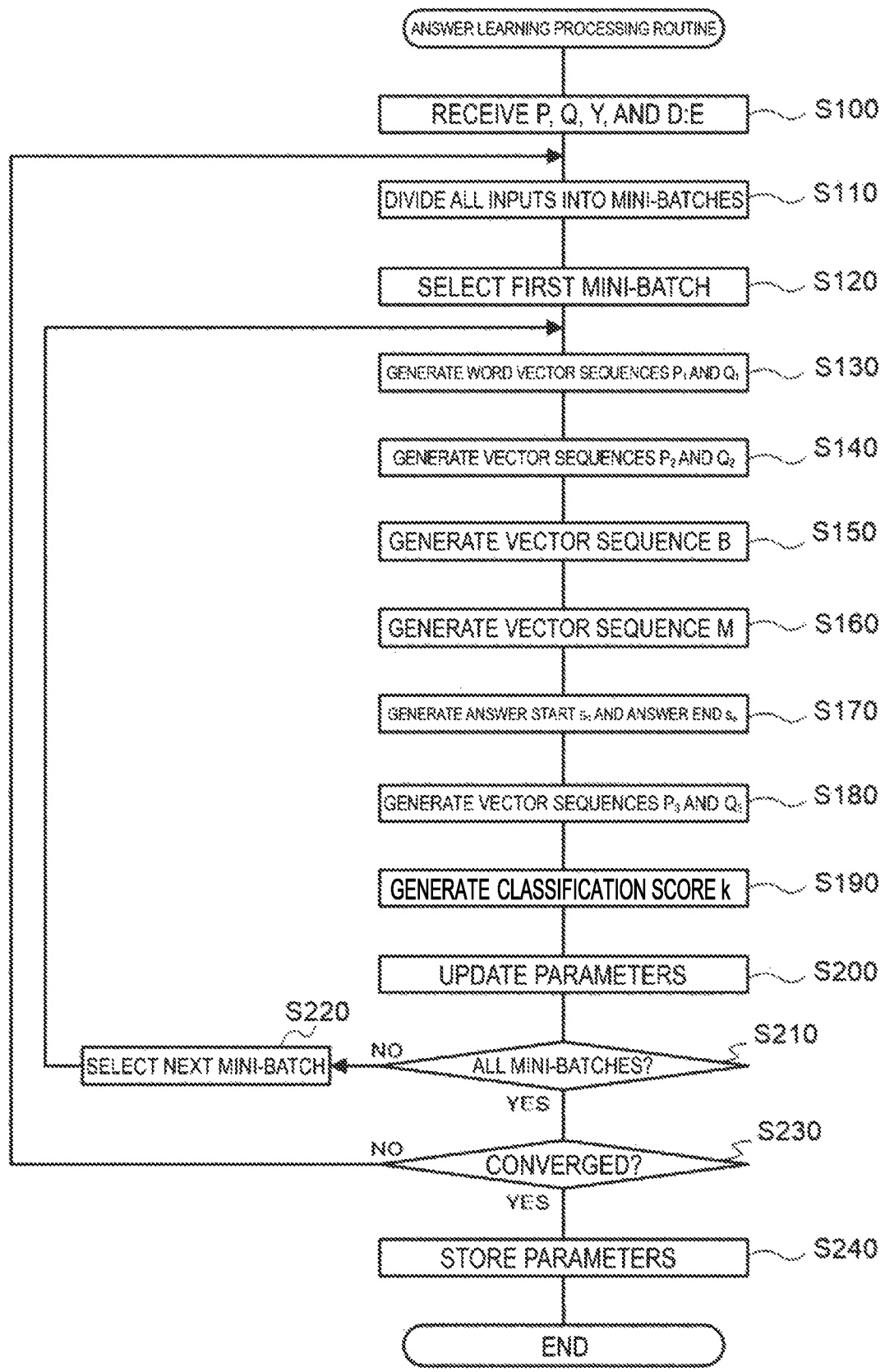
FIG. 2 is a flowchart illustrating an answer learning processing routine for the answer learning apparatus according to the first embodiment.

FIG. 2 is a flowchart illustrating an answer learning processing routine according to the first embodiment. The case where the answer learning apparatus according to the present embodiment learns using mini-batches will be described below. Here, a general neural network learning method may be used. The size of a mini-batch is set to 1 for the sake of convenience.

When a plurality of pieces of training data is input to the input unit 100, the answer learning apparatus 10 executes the answer learning processing routine illustrated in FIG. 2.

First, in step S100, the input unit 100 receives inputs of a plurality of pieces of training data, each including a piece of text P, a question Q, a correct answer Y indicating the polarity of an answer to the question in the piece of text P, and a start D and an end E of a range which serves as evidence for the answer in the piece of text P.

In step S110, the input unit 100 divides the plurality of pieces of training data received in step S100 into mini-batches. The mini-batches are sets of ε pieces of training data into which the plurality of pieces of training data is randomly divided. ε is a natural number of 1 or more.

In step S120, the word encoding unit 211 selects a first mini-batch.

In step S130, the word encoding unit 211 generates word vector sequences $P_1$ and $Q_1$ based on the piece of text P and the question Q included in the selected mini-batch.

In step S140, the first context encoding unit 213 transforms the word vector sequences $P_1$ and $Q_1$ generated in step S130 into vector sequences $P_2$ and $Q_2$, respectively, using a neural network.

In step S150, the attention unit 214 generates a reading comprehension matrix B representing the attentions between the piece of text P and the question Q based on the vector sequences $P_2$ and $Q_2$ using a neural network.

In step S160, the second context encoding unit 215 transforms the reading comprehension matrix B generated in step S150 into a reading comprehension matrix M using a neural network.

In step S170, the evidence search unit 216 estimates a start $s_d$ and an end $s_e$ of the range D:E which serves as evidence for the answer in the piece of text P using a reading comprehension model for estimating the range based on the reading comprehension matrix M.

In step S180, the input transformation unit 221 generates vector sequences $P_3$ and $Q_3$ based on the result of encoding the piece of text P by the machine reading comprehension unit 210 and the result of encoding the question Q by the machine reading comprehension unit 210.

In step S190, the score calculation unit 222 classifies the polarity of the answer to the question Q using a classification model that classifies whether the polarity of the answer to the question Q is positive or negative based on the vector sequences $P_3$ and $Q_3$.

In step S200, the parameter learning unit 300 updates parameters of the reading comprehension model and the classification model such that the correct answer Y included in the piece of training data and the classification result of the classification unit 220 match and the start D and the end E included in the piece of training data and the start $s_d$ and the end $s_e$ estimated by the machine reading comprehension unit 210 match.

In step S210, the parameter learning unit 300 classifies whether or not processing has been performed for all mini-batches.

When processing has not been performed for all mini-batches (NO in step S210), the next mini-batch is selected in step S220 and the process returns to step S130.

On the other hand, when processing has been performed for all mini-batches (YES in step S210), the parameter learning unit 300 performs convergence classification as to whether or not learning has converged in step S230.

When learning has not converged (NO in step S230), the process returns to step S110 and the processing from step S110 to step S230 is performed again.

On the other hand, when learning has converged (YES in step S230), the parameter learning unit 300 stores the learned parameters in a memory (not illustrated) in step S240.

When the size of a mini-batch is 2 or more, the following two steps may be added. The first is the step of selecting the first piece of text P and question Q after step S120. The second is the step of determining whether or not all pieces of text P and questions Q in the mini-batch have been processed before step S210, selecting the next piece of text P and question Q and returning to step S130 if the classification result is negative, and proceeding to step S210 if the classification is affirmative.

As described above, the answer learning apparatus according to the present embodiment receives a piece of training data which is described below as an input and uses a reading comprehension model and a classification model which are described below to learn parameters of these models, such that it is possible to learn a model for answering a question that can be answered with polarity accurately and with polarity. Here, the piece of training expenses data includes a piece of text, a question, a correct answer indicating the polarity of an answer to the question in the piece of text, and the start and end of a range which serves as evidence for the answer in the piece of text. The reading comprehension model estimates the range based on the piece of text and the question. The classification model classifies whether the polarity of the answer to the question is positive or negative based on information obtained through the processing of estimating the start and end of the range. The parameters of the reading comprehension model and the classification model are learned such that the result of classification on the polarity of the answer by the classification model and the correct answer included in the piece of training data match and the start and end included in the piece of training data and the estimated start and end match.

Configuration of Answer Generation Apparatus
According to First Embodiment

Figure 3:
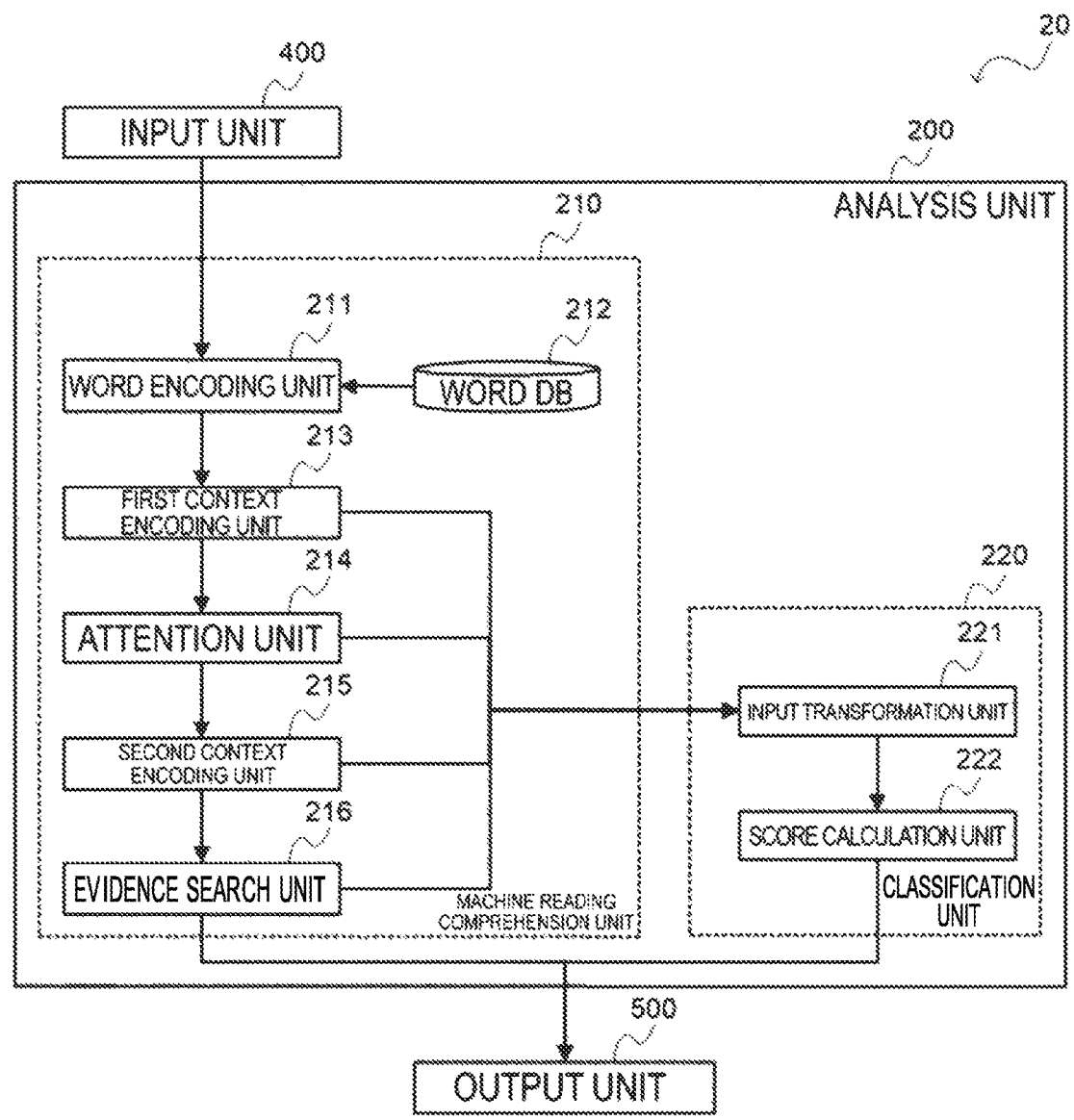
FIG. 3 is a functional block diagram illustrating a configuration of an answer generation apparatus according to the first embodiment.

A configuration of an answer generation apparatus 20 according to the first embodiment will be described with reference to FIG. 3. FIG. 3 is a block diagram illustrating the configuration of the answer generation apparatus 20 according to the first embodiment. The same components as those of the answer learning apparatus 10 described above are denoted by the same reference signs and detailed description thereof will be omitted.

The answer generation apparatus 20 is constructed by a computer including a CPU, a RAM, and a ROM storing a program for executing an answer generation processing routine that will be described later. The answer generation apparatus 20 according to the present embodiment functionally includes an input unit 400, an analysis unit 200, and an output unit 500 as illustrated in FIG. 3. The analysis unit 200 uses the parameters learned by the answer learning apparatus 10.

The input unit 400 receives apiece of text P and a question Q as an input.

Then, the input unit 400 passes the received piece of text P and question Q to the machine reading comprehension unit 210.

The output unit 500 outputs the answer range score obtained by the evidence search unit 216 of the machine reading comprehension unit 210 as evidence for the answer and outputs the classification score k obtained by the score calculation unit 222 of the classification unit 220 as the answer.

Here, the output unit 500 outputs an arbitrary output format such as outputting a classification result of a greater score among the yes and no scores of the classification score k as an answer or outputting only a classification result of a score exceeding a threshold.

Similarly, the output unit 500 can select an arbitrary output format for the answer range score. Because the answer range score includes the start $s_d$ and the end $s_e$, it is conceivable to use various methods as the output calculation method. For example, it is possible to use a method of outputting a word string in a range which maximizes the product of the start $s_d$ and the end $s_e$ under the constraint that the start $s_d$ precedes the end $s_e$ as in Non Patent Literature 1.

Operation of Answer Generation Apparatus According to First Embodiment

Figure 4:
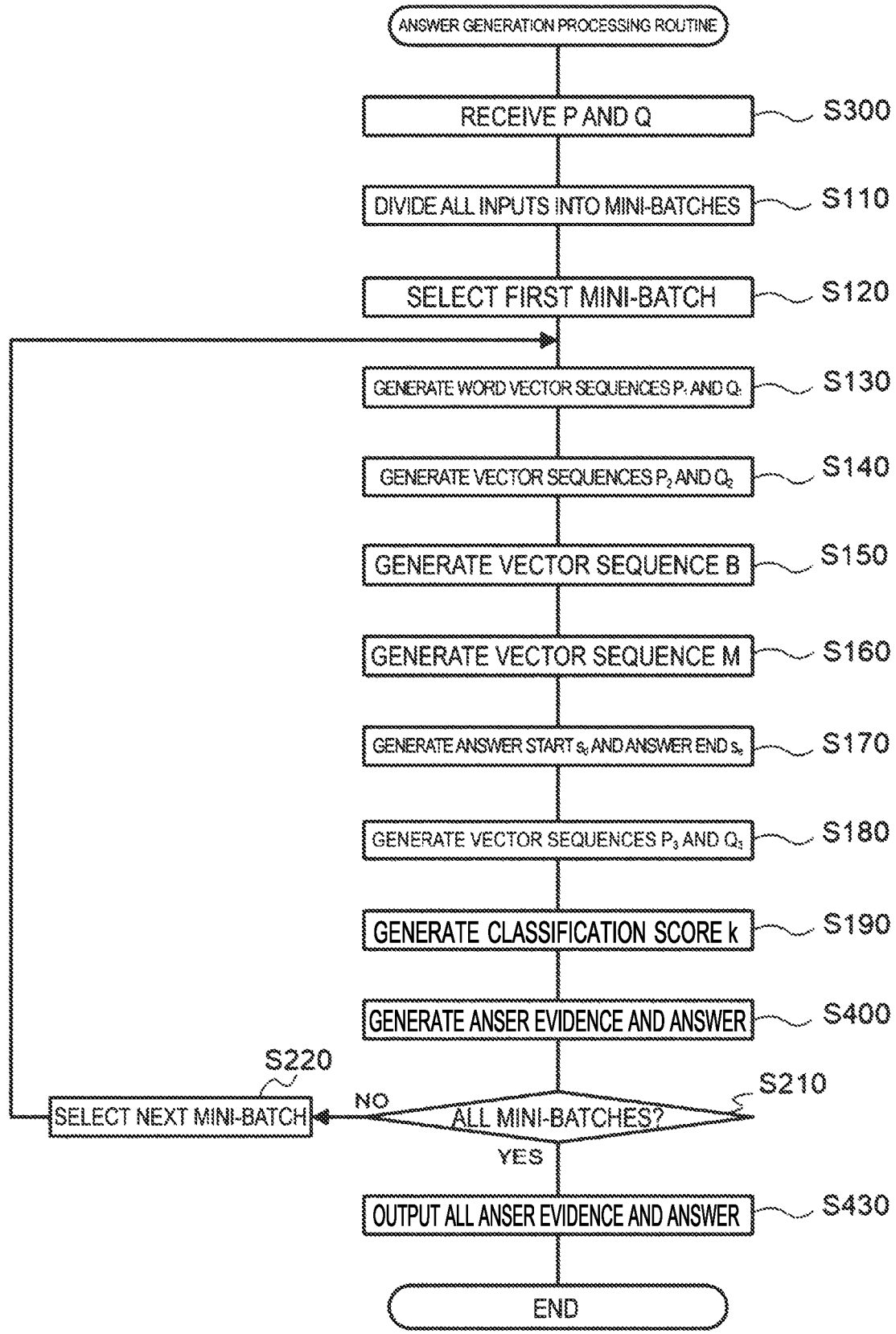
FIG. 4 is a flowchart illustrating an answer generation processing routine for the answer generation apparatus according to the first embodiment.

FIG. 4 is a flowchart illustrating an answer generation processing routine according to the first embodiment. The same processes as those of the answer learning processing routine according to the first embodiment are denoted by the same reference signs and detailed description thereof will be omitted.

When apiece of text P and a question Q are input to the input unit 400, the answer generation apparatus 20 executes the answer generation processing routine illustrated in FIG. 4.

In step S300, the input unit 400 receives the piece of text P and the question Q as an input.

In step S400, the output unit 500 generates answer evidence corresponding to the answer range score obtained in step S170 using a predetermined method and generates an answer corresponding to the classification score k obtained in step S190 using a predetermined method.

In step S430, the output unit 500 outputs all answer evidence and the answer obtained in step S400.

As described above, the answer generation apparatus according to the present embodiment classifies the polarity of an answer to an input question using a reading comprehension model and a classification model which are described below, such that it is possible to answer a question that can be answered with polarity accurately and with polarity. The reading comprehension model estimates, based on a piece of text and a question that have been input, a range which serves as evidence for an answer to the question in the piece of text. The classification model is pre-trained to classify whether the polarity of the answer to the question is positive or negative based on information obtained through the processing of estimating the start and end of the range.

Outline of Answer Learning Apparatus According to Second Embodiment

When humans understand and respond to natural language, they can infer an answer to a question through understanding based on their own experience, common sense, and world knowledge. For example, when humans read a piece of text and answer a question regarding the piece of text, they find an answer not only from the piece of text but also from their own experience and the like. However, AI has to infer an answer only from information contained in the target piece of text for the question.

In particular, knowledge necessary to answer a question that needs to be answered with yes or no is not always written at a single location. For example, the necessary knowledge may be written at a plurality of locations in the piece of text or may have to be supplemented by world knowledge. However, it is necessary to understand long-term dependencies of the piece of text in order to combine and consider descriptions at a plurality of locations in the piece of text and world knowledge. Thus, it is difficult to answer yes or no questions accurately.

Therefore, a second embodiment focuses on questions for which knowledge necessary to accurately perform a task of "answering a question, which can be answered with yes or no, with yes or no" is written at a plurality of locations in the piece of text. Similarly, the second embodiment also focuses on questions for which knowledge necessary to accurately perform the task needs to be supplemented by world knowledge. The present embodiment will be described with reference to the case where the polarity of the answer is yes or no as an example, similar to the first embodiment.

Question answering in which descriptions at a plurality of locations in a piece of text are considered together is difficult because it requires understanding of long-term dependencies which neural networks are not good at. In the present embodiment, extracting only sentences necessary for the answer as evidence sentences enables matching of evidence sentences at distant positions and realizes understanding of long-term dependencies.

Extraction of evidence sentences allows users to check not only the yes or no answer but also an appropriate number of sentences serving as evidence for the answer and thus can improve interpretability.

In addition, question answering for which necessary knowledge needs to be supplemented by world knowledge can be implemented by acquiring text in which necessary knowledge is written through web search or the like and connecting the acquired text to a target piece of text for the question to produce a new piece of text and then answering the question using the new piece of text. Such simple connection to a piece of text usually makes the matching difficult because portions in the original piece of text which are necessary for the answer and the newly connected text are at distant locations. However, the present embodiment extracts such portions as evidence sentences, thus enabling the matching even when the evidence sentences are at distant locations.

Configuration of Answer Learning Apparatus According to Second Embodiment

Figure 5:
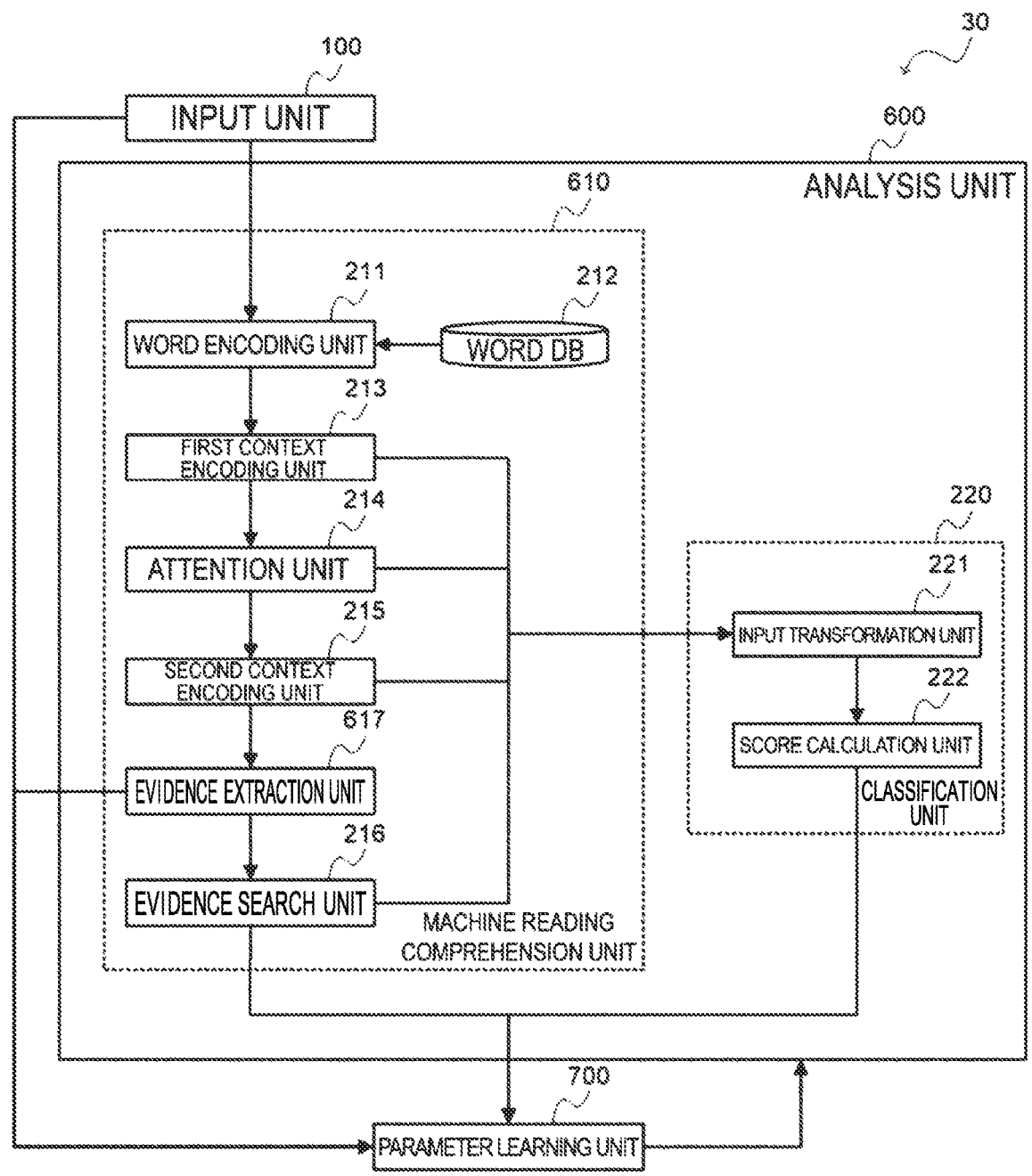
FIG. 5 is a functional block diagram illustrating a configuration of an answer learning apparatus according to a second embodiment.

A configuration of an answer learning apparatus 30 according to the second embodiment will be described with reference to FIG. 5. FIG. 5 is a block diagram illustrating the configuration of the answer learning apparatus 30 according to the second embodiment. The same components as those of the answer learning apparatus 10 according to the first embodiment described above are denoted by the same reference signs and detailed description thereof will be omitted.

The answer learning apparatus 30 is constructed by a computer including a CPU, a RAM, and a ROM storing a program for executing an answer learning processing routine that will be described later. The answer learning apparatus 30 according to the present embodiment functionally includes an input unit 100, an analysis unit 600, and a parameter learning unit 700 as illustrated in FIG. 5.

The analysis unit 600 includes a machine reading comprehension unit 610 and a classification unit 220. The machine reading comprehension unit 610 estimates a start $s_d$ and an end $s_e$ of a range D:E which serves as evidence for an answer in the piece of text P using a reading comprehension model for estimating the range D:E based on the piece of text P and the question Q.

Specifically, the machine reading comprehension unit 210 includes a word encoding unit 211, a word database (DB) 212, a first context encoding unit 213, an attention unit 214, a second context encoding unit 215, an evidence extraction unit 617, and an evidence search unit 216.

The evidence extraction unit 617 extracts evidence information of an answer to the question Q using an extraction model that extracts evidence information that is information serving as evidence for the answer to the question based on information obtained through processing of the machine reading comprehension unit 610.

Specifically, the evidence extraction unit 617 first receives a reading comprehension matrix M produced through transformation of the second context encoding unit 215 (which may be a reading comprehension matrix B before transformation) as an input and extracts a sequence H of vectors representing the meanings of sentences in the piece of text P using a neural network. The evidence extraction unit 617 can use, for example, a unidirectional RNN as a neural network.

Next, the evidence extraction unit 617 defines an operation of extracting one evidence sentence as one time and generates a state $z_t$ using the RNN of the extraction model. That is, the evidence extraction unit 617 generates the state $z_t$ by inputting an element $h_{s_{t-1}}$ of the vector sequence H corresponding to an evidence sentence extracted at time t−1 into the RNN of the extraction model. Here, $s_{t-1}$ is a subscript for the evidence sentence extracted at time t−1. Also, let $S_t$ be a set of sentences st extracted up to time t.

The evidence extraction unit 617 generates a glimpse vector $e_t$ (Equation (13) below), which is a question vector considering the importance at time t, by performing a glimpse operation on the question Q (Reference 5) using the extraction model based on the state $z_t$ and a vector sequence Y' including vectors $y_j$ corresponding to the words of the question. The extraction model performing a glimpse operation on the question Q in this way allows the extraction result of the evidence sentence to include content corresponding to the entire question.

[Reference 5] O. Vinyals, S. Bengio and M. Kudlur, "Order matters: Sequence to sequence for sets," ICLR (2016),

[Math. 10]

$$a_j^t = v_g^T \tanh(W_{g1} y_j + W_{g2} z_t) \quad (11)$$

$$\varphi^t = \text{softmax}(a^t) \in \mathbb{R}^n \quad (12)$$

$$e_t = \sum_j \varphi_j^t W_{g1} y_j \in \mathbb{R}^d \quad (13)$$

An initial value of the RNN of the extraction model is a vector obtained by max-pooling a vector sequence obtained by affine-transforming the vector sequence H.

The evidence extraction unit 617 selects a δ-th sentence according to a probability distribution represented by the following equation (14) at time t using the extraction model based on the state $z_t$, the glimpse vector $e_t$, and the vector sequence H and sets a sentence $s_t$=δ as an evidence sentence extracted at time t.

[Math. 11]

$$P(\delta; S_{t-1}) = \text{softmax}_\delta(u_\delta^t) \quad (14)$$

$$u_j^t = \begin{cases} v_p^T \tanh(W_{p1} h_j + W_{p2} e_t + W_{p3} z_t) & (j \notin S_{t-1}) \\ -\infty & (\text{otherwise}) \end{cases}$$

Then, the evidence extraction unit 617 passes the set $S_t$ of extracted sentences $s_t$ to the evidence search unit 216 and the parameter learning unit 700 as evidence information.

The evidence search unit 216 estimates a start $s_d$ and an end $s_e$ of a range D:E which serves as evidence for the answer in the piece of text P using a reading comprehension model for estimating the range D:E, similar to the first embodiment.

Specifically, while the reading comprehension matrix $$M \in \mathbb{R}^{L_p \times d_2}$$

described in the first embodiment is used, the vector sequence H representing the meanings of the sentences is used.

Because the vector sequence $$H \in \mathbb{R}^{m \times d}$$

is a sentence-level vector sequence, it is transformed to a word-level vector sequence as follows.

First, let the word index be i (i=1, . . . , $L_p$) and the sentence index be j (j=1, . . . , m). A function word_to_sent is defined such that word_to_sent(i)=j when the word i is included in the sentence j. A new word-level vector sequence H' is defined such that $h_i'$=h_word_to_sent(i) and thus $$H' \in \mathbb{R}^{L_p \times d}$$

Then, M and H' may be concatenated column-wise to obtain $$M' \in \mathbb{R}^{L_p \times (d_2 + d)}$$

and this M' may be used as a substitute for M in the subsequent processing. Although the case of using the reading comprehension matrix M has been described above as an example, another matrix such as the reading comprehension matrix B may be used. The variables such as i and j used in the above description of the evidence search unit 216 are limited to the description here.

The parameter learning unit 700 learns parameters of the reading comprehension model, the classification model, and the extraction model such that matching is achieved as follows. That is, the correct answer Y included in the piece of training data and the classification result of the classification unit 220 match. The start D and the end E included in the piece of training data and the start $s_d$ and the end $s_e$ estimated by the machine reading comprehension unit 610 match. Evidence information of the correct answer in the piece of text P included in the piece of training data and evidence information extracted by the evidence extraction unit 617 match.

Specifically, it is assumed that training data includes a plurality of sets, each including a piece of text P, a question Q, an answer Y^ which provides a correct answer of one of yes, no, and an extractive type, a start D^ and an end E^ of an evidence range which provides the correct answer corresponding to the answer Y, and a set $S_t\hat{}$ of evidence paragraphs that is evidence information providing the correct answer corresponding to the answer Y. The parameter learning unit 700 uses a linear sum of an objective function $L_C$ for the reading comprehension model used in the machine reading comprehension unit 610, an objective function $L_J$ for the classification model used in the classification unit 220, and an objective function $L_s$ for the extraction model used in the evidence extraction unit 617 as an objective function of the optimization problem (Equation (15) below).

[Math. 12]

$$\lambda_1 L_C + \lambda_2 L_J + \lambda_3 L_S \quad (15)$$

Here, $\lambda_1$, $\lambda_2$, and $\lambda_3$ are hyperparameters, which are set to appropriate values such as ⅓ such that learning proceeds. Further, even if samples contain different teacher data, each sample can be uniformly handled by setting $\lambda$ of a term relating to data not contained in the sample to 0. For example, $\lambda_1 = 0$ is set for each sample which contains no data corresponding to the output of the evidence search unit 216.

The objective functions $L_C$ and $L_J$ are similar to those of the first embodiment. The objective function $L_S$ is an objective function that has undergone coverage regularization (Reference 6). For example, an objective function such as the following equation (16) can be used as the objective function $L_S$.

[Reference 6] A. See, P. J. Liu and C. D. Manning, "Get to the point: ummarization with pointer-generator networks," ACL, 2017, pp. 1073-1083.

[Math. 13]

$$L_s = -\sum_{t=1}^{T} \log P(\hat{s}_t; S_{t-1}) + \sum_i \min(c_i^t, \varphi_i^t) \quad (16)$$

In this equation (16),
$\hat{s}_t$ is a sentence s having the smallest extraction probability $P(\delta; S_{t-1})$ at time t in the set $S_t$ of evidence sentences given as the evidence information of the correct answer, and $c^t$ is a coverage vector defined such that $$c^t = \sum_{\tau=1}^{t-1} \alpha^\tau$$

T is the end time. That is, t=T is an end condition of learning. This coverage allows the extraction result to include content corresponding to the entire question. However, in order to learn an end condition of extraction, an extraction end vector $h_{EOE}$ is used as a learnable parameter. The extraction end vector $h_{EOE}$ is added to the sequence H of vectors representing the meanings of the sentences such that the number of sentences m of the piece of text P is the actual number of sentences plus 1. T is also set to the number of true evidence sentences plus 1, and learning is performed such that the extraction end vector $h_{EOE}$ is extracted at time T after all evidence sentences are output up to time T−1. During test, extraction ends when the extraction end vector is output.

Then, the parameter learning unit 700 calculates the gradient of the objective function represented by the above equation (16) using an error backpropagation gradient method and updates the parameters using an arbitrary optimization method.

Operation of Answer Learning Apparatus According to Second Embodiment

Figure 6:
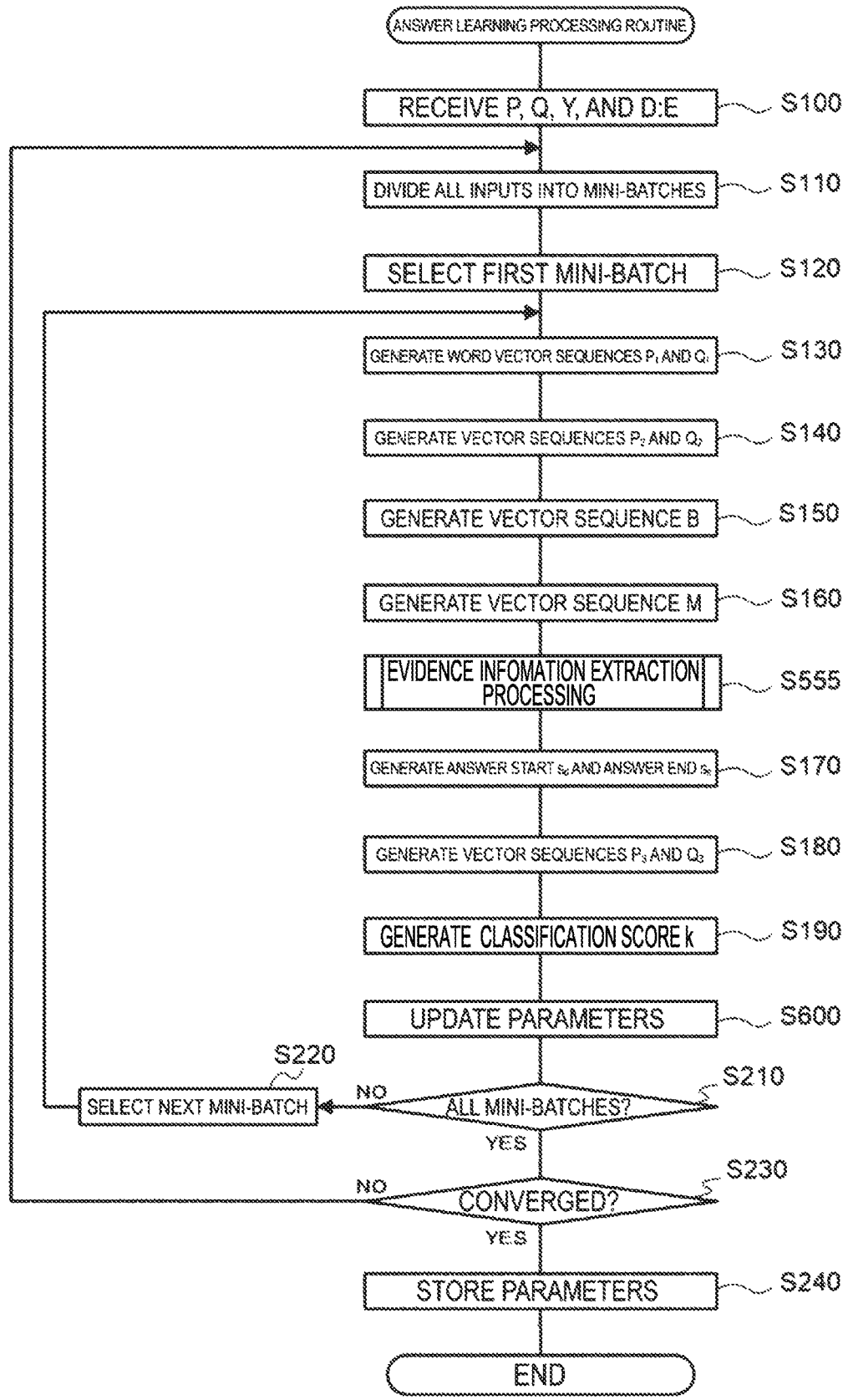
FIG. 6 is a flowchart illustrating an answer learning processing routine for the answer learning apparatus according to the second embodiment.

FIG. 6 is a flowchart illustrating an answer learning processing routine according to the second embodiment. Although the case where the answer learning apparatus according to the present embodiment learns using mini-batches will be described below, a general neural network learning method may be used. The size of a mini-batch is set to 1 for the sake of convenience. The same components as those of the answer learning processing routine according to the first embodiment described above are denoted by the same reference signs and detailed description thereof will be omitted.

In step S555, the evidence extraction unit 617 executes evidence information extraction processing.

In step S600, the parameter learning unit 700 learns parameters of the reading comprehension model, the classification model, and the extraction model such that matching is achieved as follows. That is, the correct answer Y included in the piece of training data and the classification result of the classification unit 220 match. The start D and the end E included in the piece of training data and the start $s_d$ and the end $s_e$ estimated by the machine reading comprehension unit 210 match. Evidence information of the answer in the piece of text P included in the piece of training data and evidence information extracted by the evidence extraction unit 617 match.

Figure 7:
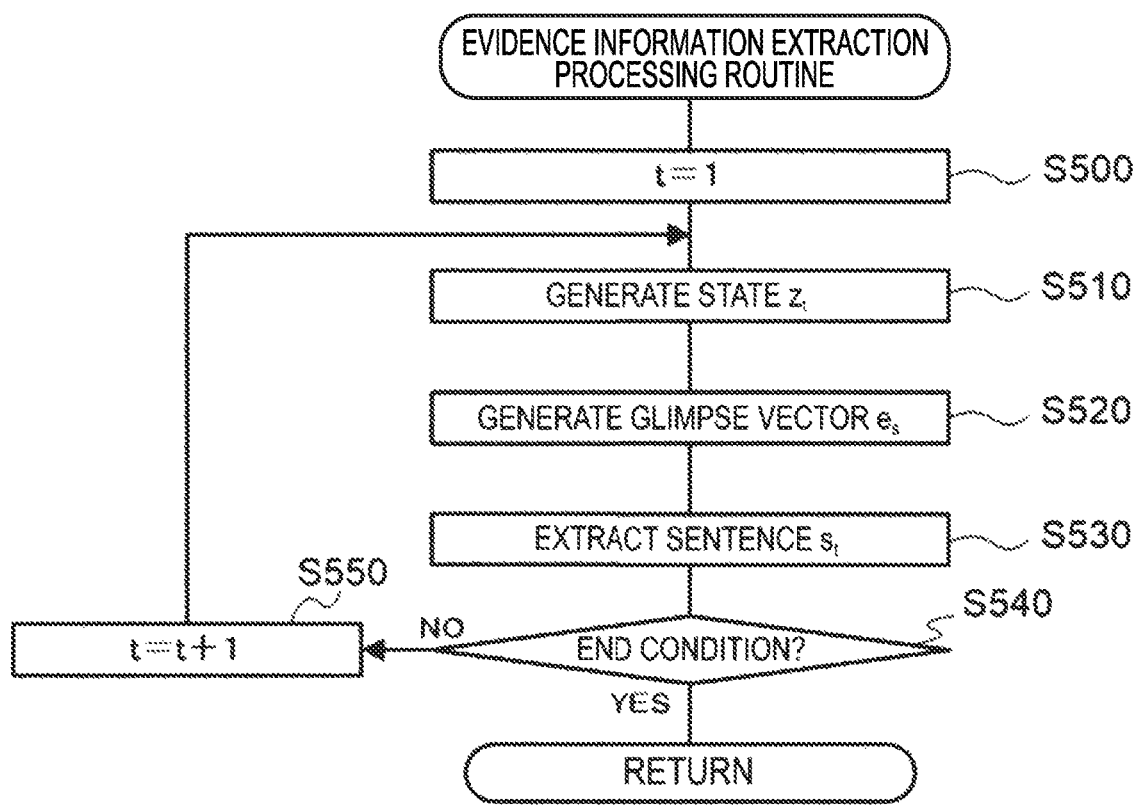
FIG. 7 is a flowchart illustrating an evidence information extraction processing routine for the answer learning apparatus according to the second embodiment.

FIG. 7 is a flowchart illustrating an evidence information extraction processing routine for the answer learning apparatus according to the second embodiment. Through the evidence information extraction processing, the evidence extraction unit 617 extracts evidence information of an answer to the question Q using an extraction model that extracts evidence information that is information serving as evidence for the answer to the question based on information obtained through processing of the machine reading comprehension unit 610.

In step S500, the evidence extraction unit 617 sets t=1.

In step S510, the evidence extraction unit 617 defines an operation of extracting one evidence sentence as one time and generates a state $z_t$ at time t using the RNN of the extraction model.

In step S520, the evidence extraction unit 617 generates a glimpse vector $e_t$, which is a question vector considering the importance at time t, by performing a glimpse operation on the question Q.

In step S530, the evidence extraction unit 617 selects δ-th sentence according to a probability distribution represented by the above equation (14) at time t and sets a sentence st such that $s_t = \delta$.

In step S540, the evidence extraction unit 617 classifies whether or not an end condition is satisfied.

If the end condition is not satisfied (NO in step S540), the evidence extraction unit 617 adds 1 to t in step S550 and returns to step S510. On the other hand, if the end condition is satisfied (YES in step S540 above), the evidence extraction unit 617 returns.

As described above, the answer learning apparatus according to the second embodiment uses an extraction model that is described below to further learn parameters of the extraction model, such that it is possible to learn a model for answering a question that can be answered with polarity more accurately and with polarity. Here, the extraction model extracts evidence information that is information serving as evidence for the answer to the question based on information obtained through processing of the machine reading comprehension unit. The answer learning apparatus extracts evidence information of the answer to the question using the extraction model and learns parameters of the extraction model such that evidence information of the answer in the piece of text included in the piece of training data and evidence information extracted by the evidence extraction unit match.

The answer learning apparatus according to the second embodiment performs multitask learning which is described below, thereby enabling matching of evidence sentences with the question even when the evidence sentences are at distant locations. Multitask learning refers to learning a plurality of models that solve a plurality of different tasks with parts of the plurality of models being shared. Here, multitask learning is performed on an extraction model that extracts evidence information that is information serving as evidence for the answer to the question, a reading comprehension model that extracts the evidence (answer) range, and a classification model that classifies the answer.

In the present embodiment, the models of the encoding units (strictly speaking, parameters of the models of the encoding units) are shared and multitask learning of the extraction model, the reading comprehension model, the classification model, and the encoding model is performed such that outputs of the extraction model, the reading comprehension model, and the classification model, which receive encoding results of the shared encoding units as common inputs, approach information corresponding to a correct answer.

Configuration of Answer Generation Apparatus According to Second Embodiment

Figure 8:
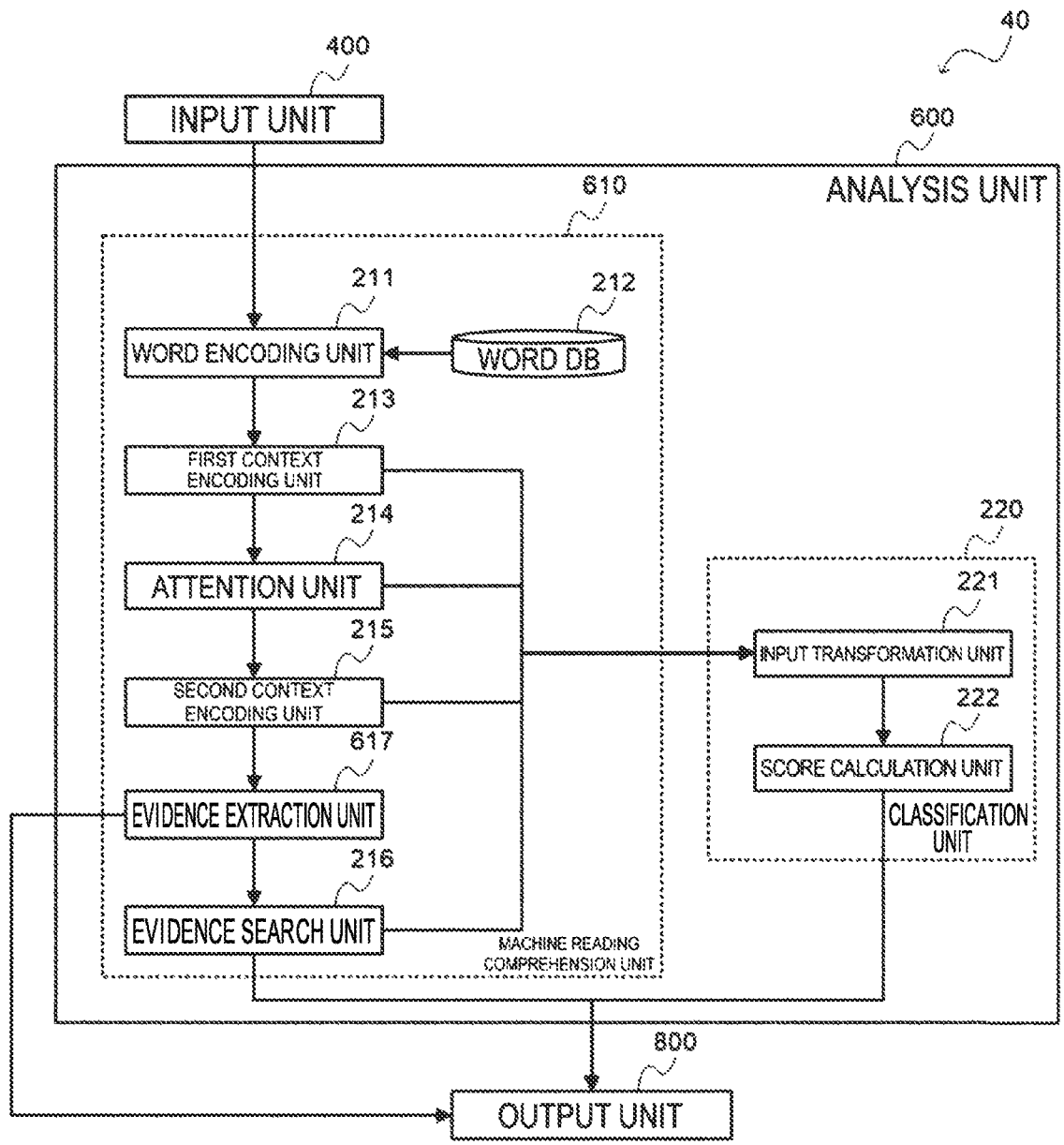
FIG. 8 is a functional block diagram illustrating a configuration of an answer generation apparatus according to the second embodiment.

A configuration of an answer generation apparatus 40 according to the second embodiment will be described with reference to FIG. 8. FIG. 8 is a block diagram illustrating the configuration of the answer generation apparatus 40 according to the second embodiment. The same components as those of the answer learning apparatus 30 described above are denoted by the same reference signs and detailed description thereof will be omitted. The answer generation apparatus 40 is constructed by a computer including a CPU, a RAM, and a ROM storing a program for executing an answer generation processing routine that will be described later and is functionally configured as shown below. The answer generation apparatus 40 according to the second embodiment includes an input unit 400, an analysis unit 600, and an output unit 800 as illustrated in FIG. 8.

The output unit 800 outputs the polarity of the answer classified by the classification unit 220 and evidence information extracted by the evidence extraction unit 617 as an answer.

Operation of Answer Generation Apparatus According to Second Embodiment

Figure 9:
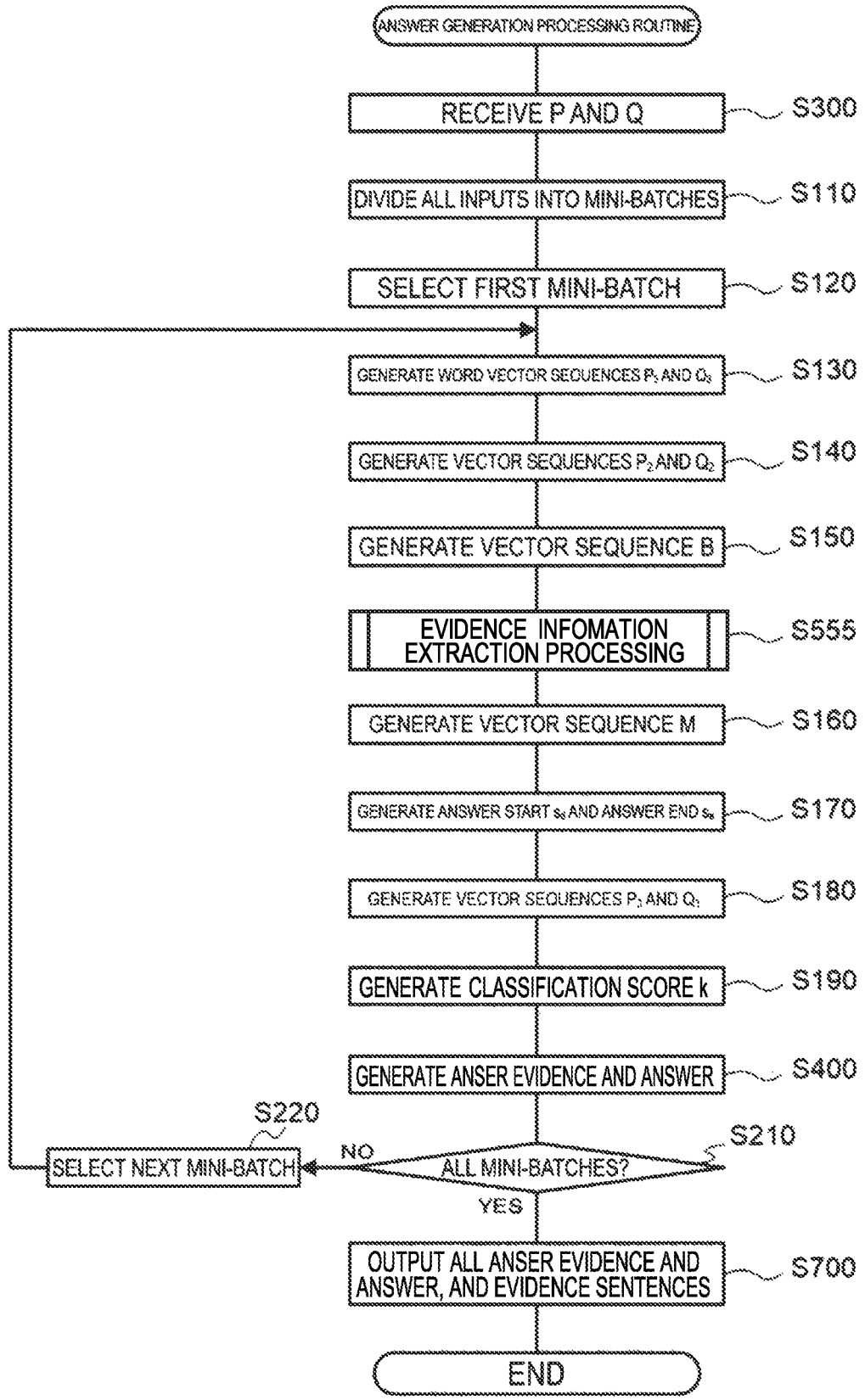
FIG. 9 is a flowchart illustrating an answer generation processing routine for the answer generation apparatus according to the second embodiment.

FIG. 9 is a flowchart illustrating an answer generation processing routine according to the second embodiment. The same processes as those of the answer generation processing routine according to the first embodiment and the answer learning processing routine according to the second embodiment are denoted by the same reference signs and detailed description thereof will be omitted.

In step S700, the output unit 800 outputs all answer evidence and the answer obtained in step S400 and the evidence information obtained in step S555.

Example of Answer Generation Apparatus According to Second Embodiment

Figure 10:
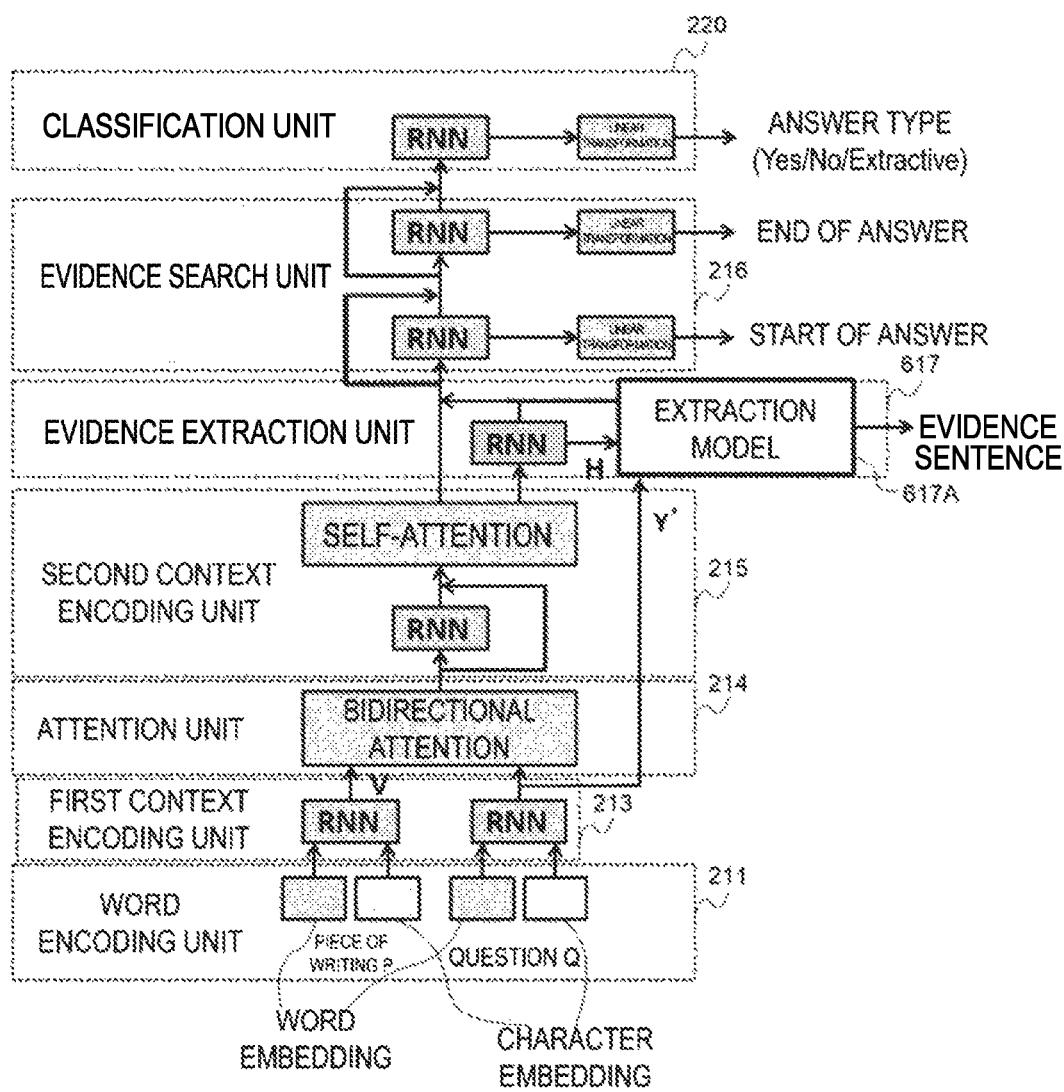
FIG. 10 is a diagram illustrating an example of a baseline model for the answer generation apparatus according to the second embodiment.

Next, an example of the answer generation apparatus according to the second embodiment will be described. In the present example, a configuration illustrated in FIG. 10 is used as the configuration of the components of the answer generation apparatus. Specifically, the classification unit 220 is constructed using an RNN and linear transformation, classifies whether to answer with a yes, no, or extractive-type answer, and outputs one of the three values of yes, no, and extractive-type answers. The evidence search unit 216 is constructed using two pairs of an RNN and linear transformation, one outputting the end of the answer and the other outputting the start of the answer. The evidence extraction unit 617 is constructed using an RNN and an extraction model 617A. The second context encoding unit 215 is constructed using RNN and self-attention, and the attention unit 214 is constructed using bidirectional attention.

The first context encoding unit 213 is constructed using two RNNs and the word encoding unit 211 is constructed using two pairs of word embedding and character embedding.

Figure 11:
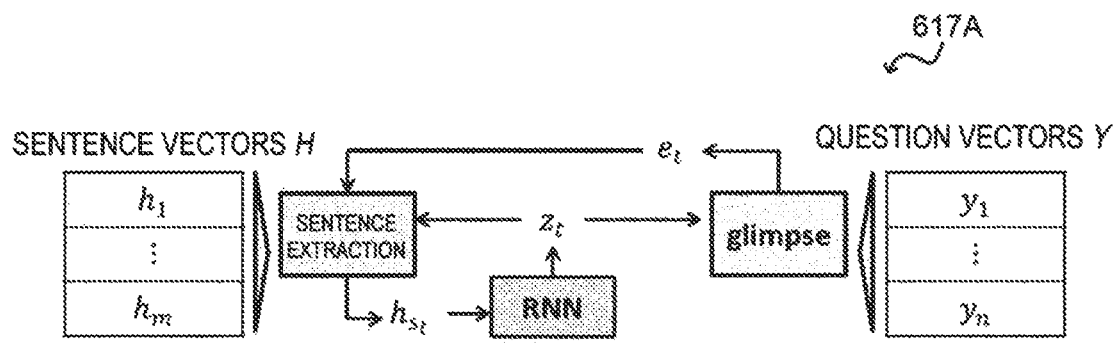
FIG. 11 is a diagram illustrating an exemplary configuration of an extraction model for an evidence extraction unit according to the second embodiment.

A configuration illustrated in FIG. 11 is used as the configuration of the extraction model 617A. This configuration is based on an extractive text summarization model proposed in Reference 7.

[Reference 7] Y. C. Chen and M. Bansal, "Fast abstractive summarization with reinforce-selected sentence rewriting," ACL, 2018, pp. 675-686.

The technique of Reference 7 is a technique of extracting sentences from a piece of text to be summarized while paying attention to the piece of text to be summarized, whereas the present example extracts sentences from the piece of text P while paying attention to the question Q. The extraction model 617A performs a glimpse operation on the question Q to allow the extraction result to include content corresponding to the entire question.

Experimental Results in Example of Answer Generation Apparatus According to Second Embodiment Next, experimental results in the example of the answer generation apparatus according to the second embodiment will be described.

Experimental Settings

An experiment was carried out using four "NVIDIA Tesla P100 (manufactured by ELSA Japan Inc.)" GPUs. Pytorch was used for implementation. The output dimensionality of a Bi-RNN was unified as d=300. The dropout keep ratio was 0.8. The batch size was 72 and the learning rate was 0.001. Settings other than these are the same as a baseline model. In the extraction model 617A, GRUs were used for RNNs and vectors were initialized using a normal distribution while matrices were initialized using a xavier normal distribution. The beam size for decoding was 2.

A model obtained by replacing the extraction model 617A in the configuration of the answer generation apparatus (FIG. 10) according to the present example with a model that obtains the evidence score of each sentence using affine transformation and a sigmoid function was used as the baseline model.

In this experiment, the prediction accuracies of an answer type T, an answer A, and an evidence sentence S were evaluated. Here, the answer type T has three labels of "yes, no, and extractive" in the task setting of HotpotQA. Exact match (EM) and partial match were evaluated for both the answer and the evidence sentence extraction. The index of partial match is the harmonic mean (F1) of precision and recall. Answers were evaluated through matching of the answer type T and were also evaluated through matching of the answer A in the case of extraction. The partial match of the evidence sentence extraction was measured by matching the ids of extracted sentences with the ids of true evidence sentences. Thus, partial matching at the word level was not taken into consideration. Regarding the answer type, the accuracy of answers when limited to "yes or no" questions was written as YN. In addition, joint EM and joint F1 (Reference 8) were used as indices considering both the accuracies of the answer and the evidence.

[Reference 8] Z. Yang, P. Qi, S. Zhang, Y. Bengio, W. W. Cohen, R. Salakhutdinov and C. D. Manning, "HotpotQA: A dataset for diverse, explainable multi-hop question answering," EMNLP, 2018, pp. 2369-2380.

This experiment was carried out for the distractor setting and the fullwiki setting. The distractor setting is a setting in which it was assumed that a large amount of text can be narrowed down to a small amount of text relating to a question through an existing technology. The fullwiki setting is a setting in which narrowing down to a small amount of text has been performed through a TF-IDF similarity search.

Experimental Results

Experimental results with test data are shown in Tables 1 and 2, where Table 1 shows results of the distractor setting and Table 2 shows results fullwiki setting.

TABLE 1

|  | ANSWER | | EVIDENCE | | Joint | |
|---|---|---|---|---|---|---|
|  | EM | F1 | EM | F1 | EM | F1 |
| BASELINE | 45.6 | 59.0 | 20.3 | 64.5 | 10.8 | 40.2 |
| PROPOSED TECHNIQUE | 53.9 | 68.1 | 57.8 | 84.5 | 34.6 | 59.6 |

TABLE 2

|  | ANSWER | | EVIDENCE | | Joint | |
|---|---|---|---|---|---|---|
|  | EM | F1 | EM | F1 | EM | F1 |
| BASELINE | 24.0 | 32.9 | 3.86 | 37.7 | 1.85 | 16.2 |
| PROPOSED TECHNIQUE | 28.7 | 38.1 | 14.2 | 44.4 | 8.69 | 23.1 |

In both the distractor setting and the fullwiki setting, the present example greatly exceeded the baseline model and achieved the state-of-the-art accuracy. In particular, the exact match of the evidence sentence was greatly improved by 37.5 points (+185%) in the distractor setting and by 10.3 points (+268%) in the fullwiki setting. Thus, it can be said that the present example is an excellent technique for extracting an appropriate number of evidence sentences. Table 3 shows experimental results in the distractor setting with development data.

TABLE 3

|  |  | ANSWER | | EVIDENCE | | Joint | |
|---|---|---|---|---|---|---|---|
|  | YN | EM | F1 | EM | F1 | EM | F1 |
| BASELINE | 57.8 | 52.7 | 67.3 | 34.3 | 78.0 | 19.9 | 54.4 |
| PROPOSED TECHNIQUE | 63.4 | 53.7 | 68.7 | 58.8 | 84.7 | 35.4 | 60.6 |
| -glimpse | 61.7 | 53.1 | 67.9 | 58.4 | 84.3 | 34.8 | 59.6 |

Because the baseline model with the development data was trained by our additional experiments, the accuracies thereof were significantly different from numerical values with the test data. This is due to the difference in hyperparameters. First, the present example exceeded the baseline model by 24.5 points in the EM of the evidence sentence extraction. An improvement of 6.7 points can be seen in F1 as well. Further, in the answer, there was an increase of 1.0 points in EM and 1.4 points in F1. In particular, the accuracy of "yes or no" classification has improved by 5.6 points. The baseline model and the present example used the same models except for the extraction model 617A. The improvement in the classification accuracy of "yes or no" despite this fact can be interpreted that multitask learning with the extraction model 617A allowed the lower RNNs to be trained to acquire feature amounts that also contribute to the answer. As a result, the accuracy of the Joint index was also improved. A technique in which only sentence extraction using an RNN was performed without using the glimpse operation was also experimented as a comparative technique and it was confirmed that the present example exceeded the comparative technique in all indices.

Table 4 shows experimental results in the fullwiki setting with the development data.

TABLE 4

|  |  | ANSWER | | EVIDENCE | | Joint | |
|---|---|---|---|---|---|---|---|
|  | YN | EM | F1 | EM | F1 | EM | F1 |
| BASELINE | 59.2 | 28.5 | 38.2 | 7.87 | 45.2 | 4.77 | 22.8 |
| PROPOSED TECHNIQUE | 62.2 | 29.0 | 38.8 | 14.4 | 44.8 | 8.43 | 23.3 |
| -glimpse | 60.8 | 28.6 | 38.2 | 13.9 | 44.5 | 8.30 | 23.0 |

In the evidence, the present example was higher than the baseline model by 6.5 points in the EM, but lower than the baseline model in F1. In the answer, there was an increase of 0.9 points in EM and 0.8 points in F1. In particular, the accuracy of "yes or no" classification has improved by 3.0 points. This can also be interpreted that the extraction model 617A advanced the training of RNNs in the lower layers. As a result, the accuracy of the Joint index was also improved. It was also confirmed that the present example exceeded the technique not using the glimpse operation in all indices.

From the above results, it was found that the accuracy of 84.7% was achieved by partial match in the distractor setting, regarding searching for a particularly necessary sentence in a small amount of related text, and the accuracy was improved by 5.6 points, regarding the improvement of the classification accuracy of "yes or no" using necessary sentences.

As described above, the answer generation apparatus according to the present embodiment follows a procedure described below, such that it is possible to answer a question that can be answered with polarity more accurately and with polarity. In the procedure, first, the answer generation apparatus extracts evidence information of an answer to a question using an extraction model that extracts evidence information that is information serving as evidence for the answer to the question based on information obtained through processing of the machine reading comprehension unit. Next, the answer generation apparatus outputs the classified polarity of the answer and the extracted evidence information as an answer.

In addition, the answer learning apparatus realizes estimation of a range serving as evidence and calculation of the classification score with reference to evidence information because the answer learning apparatus performs multitask learning for each task of the evidence extraction unit, the evidence search unit, and the classification unit.

Outline of Answer Learning Apparatus According to Third Embodiment

In the second embodiment described above, when an answer to a question is output, a range serving as evidence for the answer and evidence information which is a set of sentences are output as evidence for the answer, such that the answer result can be in a form that is easier for the user to interpret.

Here, an evidence score indicating how suitable each sentence included in the evidence information is as evidence for extracting the answer is not presented.

In addition, teacher data in which sentences for the correct answer are defined as evidence sentences is required for learning. Creating this teacher data is a difficult and costly task because it requires humans to work while thinking about "which sentences are needed for the answer."

Thus, in the present embodiment, the evidence extraction unit calculates, for each of a plurality of spans into which a piece of text is divided, an evidence score indicating how suitable the span is as evidence for extracting the answer.

Further, in the present embodiment, the spans which are units of the evidence information are paragraphs rather than sentences. Using paragraphs instead of sentences as units of evidence information makes it easier to create teacher data. This is because paragraphs are larger in granularity than sentences and contain a lot of information, so in many teacher data, one paragraph containing an answer can be used as an evidence paragraph as it is. This requires no additional human work.

Paragraphs may be different from those commonly used, and for example, the entirety of a list of bulleted items can be regarded as a paragraph or each item can be regarded as an individual paragraph. Although "paragraphs" will be described below as units into which a piece of text is divided as an example, processing that will be described below can also be performed using "sentences" as the units as in the above embodiments. Preclassified units into which a piece of text is divided will be referred to as "spans", while it is assumed that a span includes a sentence or a paragraph.

The answer type is one of "yes," "no," or an "extractive type" indicating extraction of an answer from a piece of text. The evidence range is a word string of a range representing the evidence in the piece of text, and when the answer type is extractive, a character string included in the range is also used as the answer and thus it is also referred to as an answer range. The evidence information is a set of spans serving as the evidence. That is, the evidence range (answer range) can be said to be evidence at the word level, while the evidence information can be said to be evidence at the span (sentence or paragraph) level.

Further, the present embodiment differs from the second embodiment in that the answer generation apparatus calculates and visualizes the evidence score.

The present embodiment also differs from the second embodiment in that paragraphs included in a piece of text are each regarded as a single text item, the piece of text are input to the encoding unit paragraph by paragraph, and the encoding unit uses a pre-trained language model such as Bidirectional Encoder Representations from Transformers (BERT) described in Reference 9 as a model corresponding to the word encoding unit 211, the first context encoding unit 213, the attention unit 214, and the second context encoding unit 215.

[Reference 9] BERT: Pre-training of Deep Bidirectional Transformers for Language Understanding, <online>, <URL: https://www.aclweb.org/anthology/N19-1423/>.

The present embodiment also differ from the second embodiment in that the answer learning apparatus uses paragraphs as units of evidence information and uses evidence information that has been set in units of paragraphs as evidence information of the correct answer in the piece of training data.

The points other than the above are similar to those of the second embodiment and thus the same reference signs will be used and the description thereof will be omitted.

Configuration of Answer Learning Apparatus According to Third Embodiment

Figure 12:
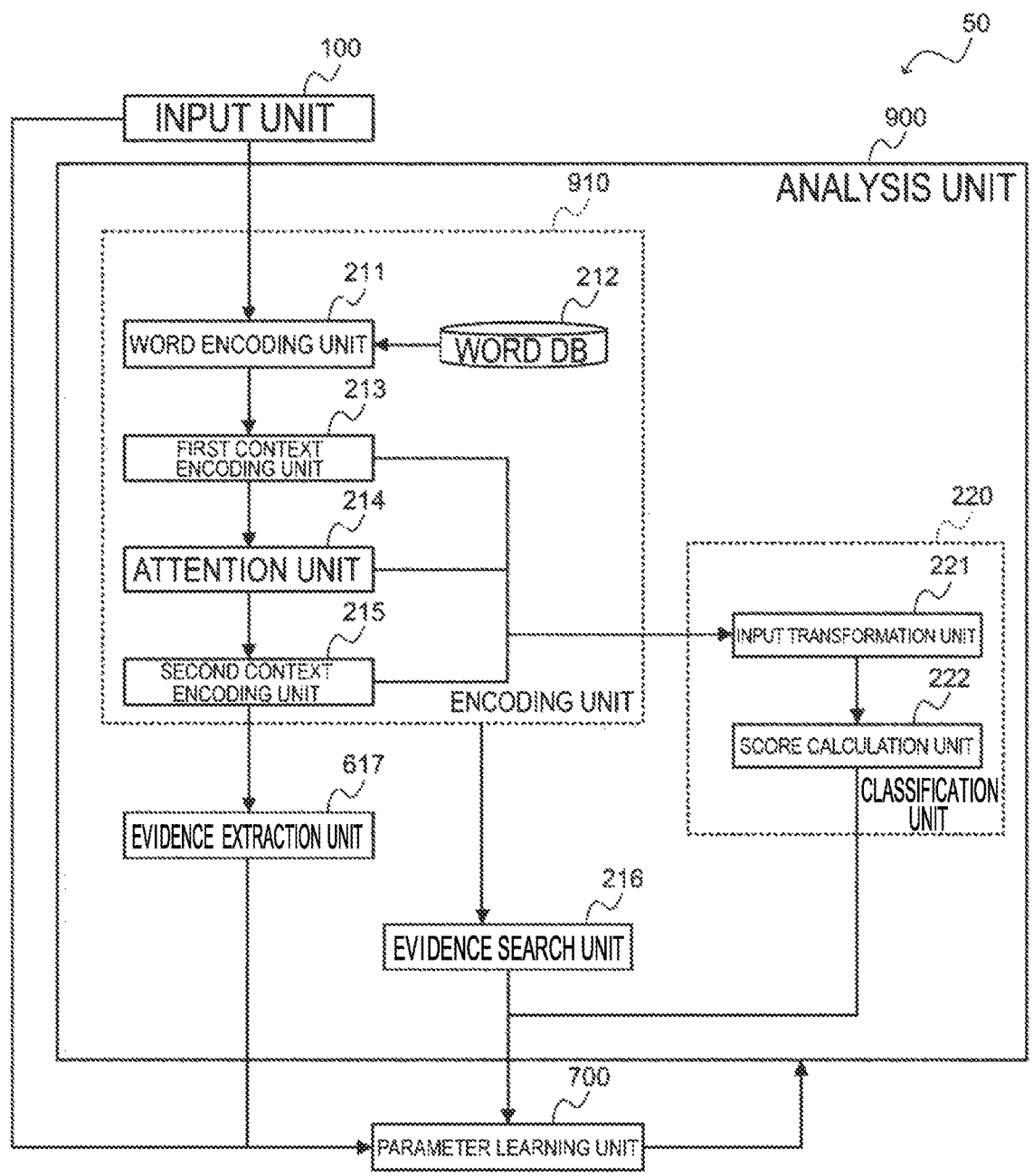
FIG. 12 is a functional block diagram illustrating a configuration of an answer learning apparatus according to a third embodiment.

A configuration of an answer learning apparatus 50 according to the third embodiment will be described with reference to FIG. 12. FIG. 12 is a block diagram illustrating the configuration of the answer learning apparatus 50 according to the third embodiment. The same components as those of the answer learning apparatus 30 according to the second embodiment described above are denoted by the same reference signs and detailed description thereof will be omitted.

The answer learning apparatus 50 is constructed by a computer including a CPU, a RAM, and a ROM storing a program for executing a processing routine similar to the answer learning processing routine illustrated in FIG. 6 described above. The answer learning apparatus 50 according to the present embodiment functionally includes an input unit 100, an analysis unit 900, and a parameter learning unit 700 as illustrated in FIG. 12.

The analysis unit 900 includes an encoding unit 910, an evidence extraction unit 617, an evidence search unit 216, and a classification unit 220.

The encoding unit 910 includes a word encoding unit 211, a word database (DB) 212, a first context encoding unit 213, an attention unit 214, and a second context encoding unit 215.

Because the BERT model which is a pre-trained language model used in the encoding unit 910 has a limitation on the length of text that can be input, a piece of text is divided into paragraphs to be input to the BERT model.

Specifically, an input to the BERT model is one text item generated by concatenating a question and text of one paragraph. An output of the BERT model is one fixed-length vector and one vector sequence. The fixed-length vector is a $d_4$-dimensional vector representing the meaning of the entirety of one paragraph and the question. The length (the number of tokens) of the vector sequence is the same as the number of tokens of an input, that is, "one text item generated by concatenating the question and text of one paragraph." One vector in the vector sequence is $d_4$-dimensional representing the meaning of one token and the size of the vector sequence is $d_4$ dimensions×the number of tokens. While words are used as the units of tokens in the present embodiment, partial words or the like may also be used.

For each paragraph in the piece of text (assuming that the number of paragraphs is n), the encoding unit 910 performs a process of inputting one text item generated by concatenating the question and text of one paragraph into the BERT model and obtaining one fixed-length vector and one vector sequence. As a result, the encoding unit 910 obtains n fixed-length vectors $V_1, \ldots, V_n$ which are n $d_4$-dimensional vectors and n vector sequences $U_1, \ldots, U_n$. $V_i$ is a fixed-length vector representing an i-th paragraph which is the result of context encoding and $U_i$ is a vector sequence representing the meanings of words in the question and the i-th paragraph. The number of paragraphs n is a variable different from "n" in the above equation (12). The fixed-length vectors $V_1, \ldots, V_n$ which are n $d_4$-dimensional vectors and the n vector sequences $U_1, \ldots, U_n$ are examples of a vector representation sequence representing the meanings of a question and spans. A fixed-length vector is a vector representation of the meaning of a word or a piece of text and is also referred to as a "vector representation." A vector sequence is an array of vector representations when it represents the meaning of a piece of text or the like and is also expressed as a "vector representation sequence." When input text consists of one word, a "vector representation sequence" corresponding to the input text is a "vector representation" and thus a "vector representation sequence" is a concept including a "vector sequence."

Further, the encoding unit 910 creates a vector sequence $U_i'$ representing the meanings of words in the question through the following two processes.

In the first process, for each of the n vector sequences $U_i$ output by the encoding unit 910, only vectors at positions corresponding to the question are extracted from the vector sequence $U_i$ to extract a vector sequence. Here, the extracted vector sequence has the same number of words and length as the question and each vector included in the vector sequence represents one word in the question.

In the second process, the vector sequences extracted from the n vector sequences $U_i$ are averaged or summed to obtain one vector sequence which is defined as the vector sequence $U_i'$.

The evidence extraction unit 617 extracts evidence information of an answer to the question Q using an extraction model that extracts evidence information that is information serving as evidence for the answer to the question based on information obtained through processing of the encoding unit 910.

Specifically, the evidence extraction unit 617 first receives n fixed-length vectors $V_i$ obtained through processing of the encoding unit 910 as an input and extracts a sequence H of vectors representing the meanings of paragraphs in the piece of text P using a neural network. The evidence extraction unit 617 can use, for example, a unidirectional RNN as a neural network. Alternatively, the evidence extraction unit 617 may generate a sequence H of vectors by arranging n fixed-length vectors $V_i$ without using a neural network.

Next, the evidence extraction unit 617 defines an operation of extracting one evidence paragraph as one time and generates a state $z_t$ using the RNN of the extraction model. That is, the evidence extraction unit 617 generates the state $z_t$ by inputting an element
$h_{S_{t-1}}$
of the vector sequence H corresponding to an evidence paragraph extracted at time t−1 into the RNN of the extraction model. Here, $s_{t-1}$ is a subscript for the evidence paragraph extracted at time t−1. Also, let $S_t$ be a set of paragraphs st extracted up to time t.

The evidence extraction unit 617 generates a glimpse vector et (the above Equation (13)), which is a question vector considering the importance at time t, by performing a glimpse operation on the question Q (the above Reference 5) using the extraction model based on the state $z_t$ and a vector sequence $U_i'$ representing the meanings of the words of the question. The evidence extraction unit 617 performs calculation by substituting the vector $y_j$ in the above equation (13) with the j-th vector of the vector sequence $U_i'$. $v_g$, $W_{g1}$, and $W_{g2}$ in the above equations (11) to (13) and $v_p$, $W_{p1}$, $W_{p2}$, and $W_{p3}$ in the above equation (14) are parameters of the extraction model and updated by the parameter learning unit 700. $h_j$ in the above equation (14) is the j-th vector of the vector sequence H.

The extraction model performing a glimpse operation on the question Q in this way allows the extraction result of the evidence paragraph to include content corresponding to the entire question.

An initial value of the RNN of the extraction model is a vector obtained by max-pooling a vector sequence obtained by affine-transforming the vector sequence H.

The evidence extraction unit 617 selects a δ-th paragraph according to a probability distribution represented by the above equation (14) at time t using the extraction model based on the state $z_t$, the glimpse vector $e_t$, and the vector sequence H and sets a paragraph $s_t=\delta$ as an evidence paragraph extracted at time t. Note that the value $u_j^t$ in the above equation (14) differs from the vector sequence $U_i'$.

Then, the evidence extraction unit 617 passes the set $S_t$ of extracted paragraphs $s_t$ to the evidence search unit 216 and the parameter learning unit 700 as evidence information.

Using a reading comprehension model for estimating a range D:E which serves as evidence for the answer in the piece of text P, the evidence search unit 216 estimates a start $s_d$ and an end $s_e$ of the range based on a vector sequence $U_i$ corresponding to evidence information (a paragraph) that provides the correct answer in the piece of training data among the n vector sequences $U_i$ output by the encoding unit 910.

Specifically, the evidence search unit 216 has two neural networks, a start deep learning model for estimating the start $s_d$ of the range which serves as evidence for the answer and an end deep learning model for estimating the end $s_e$. This deep learning model includes, for example, a linear transformation layer or a multi-layered linear transformation layer.

The evidence search unit 216 first inputs a vector sequence Ui corresponding to evidence information (a paragraph) that provides the correct answer into the start deep learning model and calculates, for each word in the evidence information (paragraph) that provides the correct answer, a score regarding the start of an answer range that is a range serving as evidence for the answer.

Further, the evidence search unit 216 inputs the vector sequence Ui corresponding to evidence information (paragraph) that provides the correct answer into the end deep learning model and calculates, for each word in the evidence information (paragraph) that provides the correct answer, a score regarding the end of an answer range that is a range serving as evidence for the answer.

The score regarding the start and the score regarding the end calculated for each word in the evidence information (paragraph) that provides the correct answer will be collectively referred to as an answer range score. Parameters of the start deep learning model and the end deep learning model are updated by the parameter learning unit 700.

Then, the evidence search unit 216 passes the calculated answer range score to the parameter learning unit 700.

The internal processing and neural network configurations of the evidence search unit 216 may be the same as those of the evidence search unit 216 of the second embodiment.

The classification unit 220 classifies the polarity of the answer to the question Q using a classification model that classifies whether the polarity of the answer to the question Q is positive or negative based on information obtained through processing of the encoding unit 910.

Specifically, the classification unit 220 includes an input transformation unit 221 and a score calculation unit 222.

The input transformation unit 221 extracts a fixed-length vector $V_i$ corresponding to the evidence information (paragraph) of the correct answer in the piece of training data from the n fixed-length vectors $V_i$ output by the encoding unit 910 and passes the extracted fixed-length vector $V_i$ to the score calculation unit 222.

The score calculation unit 222 classifies the polarity of the answer to the question Q using the classification model that classifies whether the polarity of the answer to the question Q is positive or negative.

Specifically, the score calculation unit 222 calculates a classification score representing the classification result of whether the answer type is yes, no, or extractive using a classification model that is a deep learning model including a linear transformation layer, a multi-layered linear transformation layer, or the like based on the fixed-length vector $V_i$ corresponding to the evidence information (paragraph) of the correct answer. The classification score calculated here is a three-dimensional vector.

The internal processing and neural network configurations of the classification unit 220 may be the same as those of the classification unit 220 of the first embodiment. For example, the classification unit 220 may be configured to classify the answer type into three, yes, no, and extractive, and perform the same processing as that of the classification unit 220 of the first embodiment.

Then, the score calculation unit 222 passes the classification score to the parameter learning unit 700.

The parameter learning unit 700 learns parameters of the reading comprehension model, the classification model, and the extraction model such that matching is achieved as follows. That is, the correct answer $Y^\wedge$ included in the piece of training data and the classification result of the classification unit 220 match. The start $D^\wedge$ and the end $E^\wedge$ included in the piece of training data and the start $s_d$ and the end $s_e$ estimated by the evidence search unit 216 match. Evidence information of the correct answer in the piece of text P included in the piece of training data and evidence information extracted by the evidence extraction unit 617 match.

Specifically, it is assumed that training data includes a plurality of sets, each including a piece of text P, a question Q, an answer $Y^\wedge$ which provides a correct answer of one of yes, no, and an extractive type, a start $D^\wedge$ and an end $E^\wedge$ of an evidence range which provides the correct answer corresponding to the answer Y, and a set $S_t^\wedge$ of evidence paragraphs that is evidence information providing the correct answer corresponding to the answer Y.

Here, the answer $Y^\wedge$ which provides the correct answer is information indicating whether the answer type is yes, no, or extractive. The evidence information providing the correct answer is a set of paragraphs as spans that serves as evidence for determining the answer type or extracting the evidence range and is a subset of a set of all paragraphs included in the piece of text P. When the answer type is yes or no with polarity, the evidence information is a set of paragraphs which serves as evidence for the classification of yes or no. When the answer type is extractive, the evidence information is a set of paragraphs containing a true answer range.

The other configurations and operations of the answer learning apparatus 50 are similar to those of the second embodiment and thus the description thereof will be omitted.

Configuration of Answer Generation Apparatus
According to Third Embodiment

Figure 13:
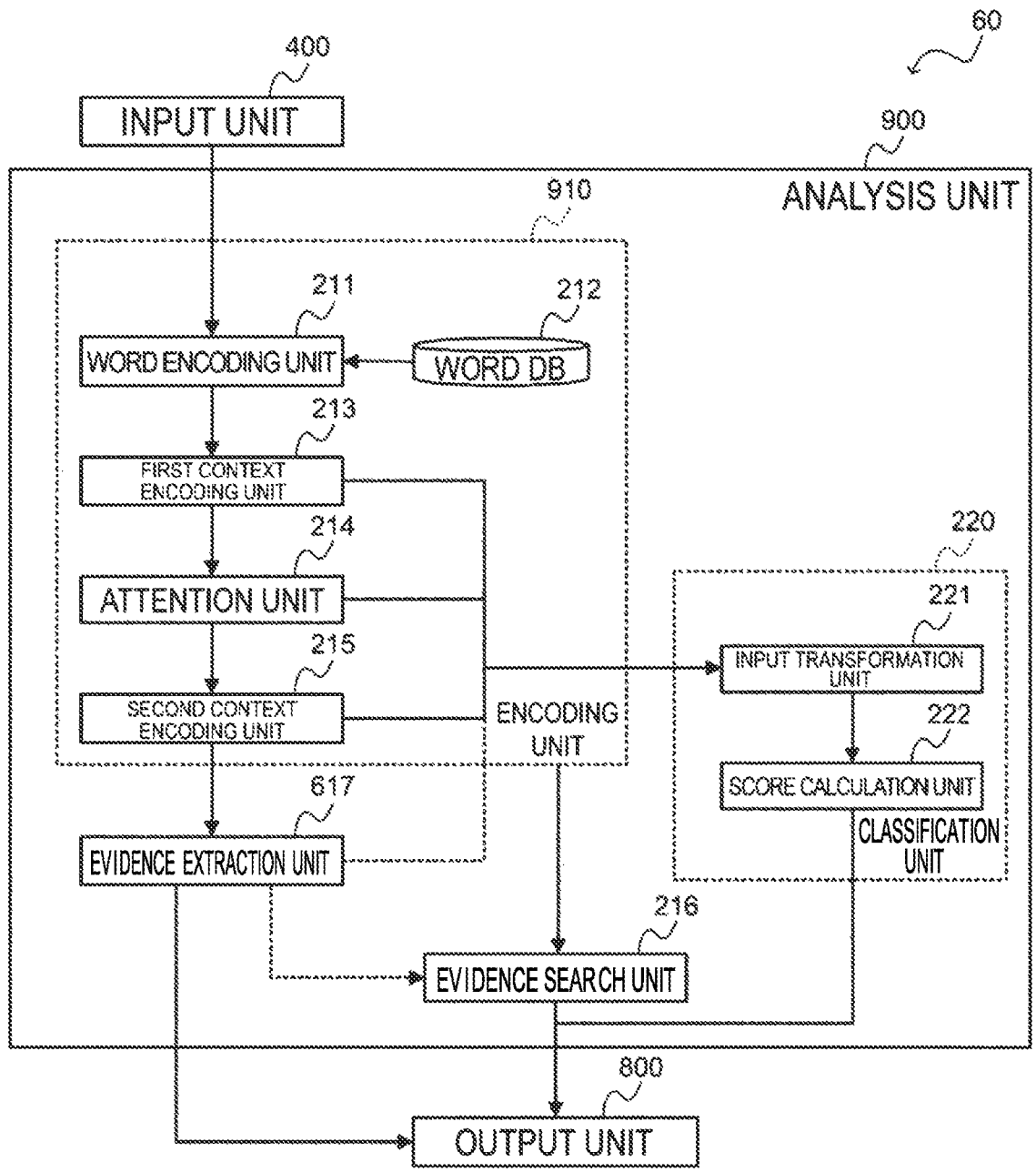
FIG. 13 is a functional block diagram illustrating a configuration of an answer generation apparatus according to the third embodiment.

A configuration of an answer generation apparatus 60 according to the third embodiment of the present disclosure will be described with reference to FIG. 13. FIG. 13 is a block diagram illustrating the configuration of the answer generation apparatus 60 according to the third embodiment of the present disclosure. The same components as those of the answer learning apparatus 50 according to the third embodiment described above will be denoted by the same reference signs and detailed description thereof will be omitted.

The answer generation apparatus 60 is constructed by a computer including a CPU, a RAM, and a ROM storing a program for executing a processing routine similar to the answer generation processing routine illustrated in FIG. 9 that has been described above and is functionally configured as shown below. The answer generation apparatus 60 according to the present embodiment includes an input unit 400, an analysis unit 900, and an output unit 800 as illustrated in FIG. 13.

The analysis unit 900 includes an encoding unit 910, an evidence extraction unit 617, a evidence search unit 216, and a classification unit 220.

The evidence extraction unit 617 extracts the evidence information of the answer to the question Q and calculates evidence scores for paragraphs which are spans in the piece of text P. Here, the evidence extraction unit 617 uses an extraction model that extracts the evidence information that is information serving as evidence for the answer to the question based on information obtained through processing of the encoding unit 910.

Specifically, in the evidence score calculation, the evidence extraction unit 617 calculates, for each paragraph in the piece of text P, an evidence score indicating the degree to which the paragraph is suitable as evidence for extracting the answer using the extraction model based on the state $z_t$, the glimpse vector $e_t$, and the vector sequence H.

For example, a value $P(\delta; S_{(t-1)})$ for a paragraph δ at time t is calculated according to the above equation (14) and set as a score $A_t(\delta)$. Then, an evidence score of paragraph δ is defined as maxt $A_t(\delta)$ or sumt $A_t(\delta)$.

The evidence score can be calculated through the same processing even when the span is a sentence rather than a paragraph. In this case, the evidence score is a score representing the degree to which the sentence is suitable as the evidence for extracting the answer.

The evidence extraction unit 617 passes the extracted evidence information and the evidence score for each paragraph to the output unit 800 and passes the extracted evidence information to the evidence search unit 216 and the input transformation unit 221.

Using a reading comprehension model for estimating a range D:E which serves as evidence for the answer in the piece of text P, the evidence search unit 216 estimates the start $s_d$ and the end $s_e$ of the range based on a vector sequence $U_i$ corresponding to each paragraph extracted as evidence information by the evidence extraction unit 617 among the n vector sequences $U_i$ output by the encoding unit 910.

The input transformation unit 221 extracts a fixed-length vector $V_i$ corresponding to each paragraph extracted as evidence information by the evidence extraction unit 617 from the n fixed-length vectors $V_i$ output by the encoding unit 910 and passes the extracted fixed-length vector $V_i$ to the score calculation unit 222.

The score calculation unit 222 classifies the polarity of the answer to the question Q using the classification model that classifies whether the polarity of the answer to the question Q is positive or negative.

Specifically, the score calculation unit 222 calculates a classification score representing the classification result of whether the answer type is yes, no, or extractive using a classification model that is a deep learning model including a linear transformation layer, a multi-layered linear transformation layer, or the like based on the fixed-length vector $V_i$ corresponding to each paragraph extracted as evidence information by the evidence extraction unit 617.

The output unit 800 takes as inputs a set St of paragraphs extracted by the evidence extraction unit 617, an evidence score for each paragraph, a classification score indicating the classification result of three types, yes, no, or extractive, output by the classification unit 220, and an answer start score and an answer end score of each word obtained by the evidence search unit 216.

If each paragraph in the piece of text upon has already be given a score when being input to the answer generation apparatus 60, the score can be input to the output unit 800 as a search score. For example, a score that a search technique outputs when performing general search to narrow down to the paragraph in the entire Wikipedia® may be used as the search score.

For an each arbitrary word string in the paragraph extracted as evidence information by the evidence extraction unit 617, the output unit 800 calculates the product or sum of an answer start score for the start of the word string and an answer end score for the end of the word string as an answer word string score. The answer word string score is a score indicating that the word string is the answer or evidence for the answer.

When the classification result of the answer type is "extractive," this answer word string score calculation gives answer word string scores for all candidates that can be considered as a word string in the piece of text, that is, an extractive-type answer. Assuming that the number of words of an evidence paragraph extracted by the evidence extraction unit 617 is L, the number of candidates is $_LC_2$ which is the number of 2-combinations from L elements.

Further, the output unit 800 calculates reading comprehension scores for all combinations of the evidence paragraph extracted by the evidence extraction unit 617, the classification result of the answer type, and the answer word string according to the following equation.

Reading comprehension score=(search score×search score weight)+(evidence score×evidence score weight)+(answer word string score×answer word string score weight)+(classification score× classification score weight)

Here, the score weights are numerical values that can be classified by the user, and for example, are all 1. The term of the search score is used only when the search score has been given.

The output unit 800 outputs combinations of the reading comprehension score, the evidence paragraph, the classification result, and the answer word string in descending order of the reading comprehension score. The number of combinations to be output is a preset number or is classified based a threshold for the reading comprehension score.

The other configurations and operations of the answer generation apparatus 60 are similar to those of the second embodiment and thus the description thereof will be omitted.

According to the answer generation apparatus of the third embodiment, the evidence search unit and the classification unit perform processing based on evidence information extracted by the evidence extraction unit as described above, thus enabling processing more explicitly based on evidence information and more accurate answering. In addition, the evidence score can be calculated and visualized for each paragraph and the answer can be output in a form that is easier for the user to interpret.

In addition, because evidence paragraphs are extracted as evidence information, it becomes easy to create teacher data to be input to the answer learning apparatus and it is possible to learn a model capable of accurately estimating the polarity of the answer.

The present disclosure is not limited to the above embodiments and various modifications and applications are possible without departing from the gist of the present invention.

In the above embodiments, the vector sequences $P_3$ and $Q_3$ are generated based on the result of encoding the piece of text P by the machine reading comprehension unit 210 and the result of encoding the question Q by the machine reading comprehension unit 210. However, the polarity of the answer to the question Q may be classified using a classification model that classifies whether the polarity of the answer to the question Q is positive or negative by further taking, as inputs, at least one of the start $s_d$ and the end $s_e$ of the range which serves as evidence for the answer estimated by the machine reading comprehension unit 210 and an attention matrix A representing the relationship between the piece of text P and the question Q.

In this case, the second context encoding unit 215 passes the transformed reading comprehension matrix M to the input transformation unit 221 and the evidence search unit 216 passes the estimated answer range score to the input transformation unit 221.

For example, the input transformation unit 221 can use the following equation (17) or (18) as a method of calculating the vector sequence $P_3$.

Math. [14]

$$P_3 = \text{Linear}(B) + M \quad (17)$$

$$P_3 = [B, s_d, s_e] \quad (18)$$

Here, Linear( ) represents linear transformation.

For example, the input transformation unit 221 can use the following equation (19) as a method of calculating the vector sequence $Q_3$.

[Math. 15]

$$\alpha_i = \text{softmax}(A_{i,:}) \in \mathbb{R}^{L_Q}$$
$$\tilde{Q}_{i,:} = \sum_j \alpha_{i,j} Q_{2,j,:} \in \mathbb{R}^{d_1} \quad (19)$$

The same operation may be performed on the attention matrix $A^T$ and the vector sequence P to obtain a vector sequence and the obtained vector sequence may be used as the vector sequence $Q_3$ or a combination of the obtained vector sequence with the vector sequence $Q_2$ may be used.

Variables necessary for the input transformation unit 221 are classified according to such variations.

To deal with problems peculiar to the task, the score calculation unit 222 can use an existing framework for the sentence pair classification task with some approaches applied thereto.

The following approaches can be used, for example, when the above ESIM framework is used.

Approach 1

Because the piece of text P is a piece of text rather than a sentence, the length $L_P$ of the sequence may be larger than that of the sentence pair classification task. To deal with this problem, max pooling and average pooling are replaced with a longer-sequence oriented technique.

Specifically, max pooling and average pooling may be replaced with a technique which uses a final state of the output of the LSTM when the vector sequence $Q_3$ has been input to the LSTM or with attentive pooling (which is an operation of averaging weights in each column where a linear transformation of the vector sequence $P_3$, the estimated start $s_d$ and end $s_e$, or the like are used as the weights).

Approach 2

Compared to the sentence pair classification task, the vector sequence $P_3$ to be classified in the above embodiment tends to include not only information of the piece of text P but also information of the question Q abundantly. Thus, the score calculation unit 222 may obtain a vector J using only the vector sequence $P_3$ without using the vector sequence $Q_3$.

In this case, information received by the input transformation unit 221 can be only (1) the reading comprehension matrix B. The above equation (6) is used for transformation into the vector sequence $P_3$. Here, J is defined such that $$J = [P_m; P_a] \in \mathbb{R}^{2d_3}$$

The answer learning apparatus 10 may further include a question classification unit that classifies whether or not the input question Q is a "question that can be answered with yes or no."

A conventional method such as a rule based method or classification using machine learning may be used as the classification method of the question classification unit. In this case, the answer learning apparatus 10 may be configured such that, when the classification result of the question classification unit is that the input question is "not a question that can be answered with yes or no," the output (of yes or no) from the classification unit 220 is not performed, i.e., only the output from the machine reading comprehension unit 210 is performed.

Provision of such a question classification unit can prevent answering with yes or no in cases where it is inappropriate to answer with yes or no when the output of the classification unit 220 has a binary value of yes or no. In addition, questions that are inappropriate to answer with yes or no can be excluded from training data and more appropriate learning can be performed.

Further, when the output of the classification unit 220 has a ternary value of yes, no, or unknown, the meaning of the output "unknown" becomes clearer. If the question classification unit is not provided, "unknown" has a mixture of two meanings: "it is inappropriate to answer the question with yes or no" or "the question cannot be answered (for a reason such as absence of descriptions on the evidence for the answer in piece of text P)." However, if the question classification unit makes a classification, the meaning of "unknown" can be narrowed down to the latter.

Further, the question classification unit may be provided in the answer generation apparatus 20. By having the question classification unit, the answer generation apparatus 20 can prevent answering with yes or no in cases where it is inappropriate to answer with yes or no when the output of the classification unit 220 has a binary value of yes or no.

Although the present embodiment has been described with reference to examples of using the classification model that classifies whether the answer is yes or no, the present embodiment is not limited thereto. The classification model may classify whether the answer is yes, no, or extractive, and when the answer is an extractive-type answer, the output unit may output an evidence sentence output by the evidence extraction unit 617 or a range of evidence for the answer output by the evidence search unit 216 as an extractive-type answer.

Further, although the above embodiments have been described with reference to the case where the polarity of the answer is yes or no as an example, the present invention is not limited to this and the polarity of the answer may be, for example, OK or NG.

Further, in the answer generation apparatus 60 of the third embodiment, the evidence extraction unit 617 may not pass the evidence information to the evidence search unit 216. In this case, the evidence search unit 216 estimates the start and end of the range that serves as the evidence for the answer in the piece of text P without using the evidence information. Specifically, the evidence search unit 216 estimates the start and end of the range that serves as the evidence for the answer in the piece of text P by using the n vector sequences $U_i$ output by the encoding unit 910 as they are.

Further, in the answer generation apparatus 60 of the third embodiment, the evidence extraction unit 617 may not pass the evidence information to the input transformation unit 221 of the classification unit 220. In this case, the input transformation unit 221 passes the n fixed-length vectors $V_i$ output by the encoding unit 910 to the score calculation unit 222 as they are. The score calculation unit 222 calculates the classification score based on the n fixed-length vectors $V_i$.

Even when the evidence search unit 216 and the classification unit 220 do not use the evidence information extracted by the evidence extraction unit 617 as described above, the answer learning apparatus 50 performs multitask learning for each task of the evidence extraction unit 617, the evidence search unit 216, and the classification unit 220, such that estimation of the evidence range and calculation of the classification score with reference to the evidence information are realized.

Further, although embodiments in which the program is installed in advance have been described in the specification of the present application, the program can also be stored and provided in a computer-readable recording medium.

The following additional descriptions will further be disclosed with regard to the above embodiments.

Additional Description 1

An answer generation apparatus includes:
 a memory; and
 at least one processor connected to the memory,
 wherein the processor executes:
  transforming a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text;
  estimating evidence information that is a span suitable as evidence for extracting the answer using a pre-trained extraction model that extracts the span suitable as the evidence for extracting the answer based on the vector representation sequence;
  estimating an evidence range that is a range serving as evidence for the answer in the piece of text using a pre-trained search model that extracts the evidence range based on the vector representation sequence and the evidence information; and
  determining an answer type for the question using a pre-trained classification model that classifies an answer type which is a correct answer corresponding to the answer to the question in the piece of text based on the vector representation sequence and the evidence information.

Additional Description 2

An answer generation apparatus includes:
 a memory; and
 at least one processor connected to the memory,
 wherein the processor executes:
  transforming a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text; and
  estimating, for each of the spans, an evidence score indicating a degree to which the span is suitable as evidence for extracting the answer using a pre-trained extraction model for calculating the evidence score based on the vector representation sequence, and
 the pre-trained encoding model and the pre-trained extraction model are pre-trained through multitask learning of a plurality of models including encoding and extraction models and further including:
  a search model that extracts an evidence range that is a range serving as evidence for the answer in the piece of text based on the vector representation sequence produced through transformation using the encoding model; and
  a classification model that classifies an answer type which is a correct answer corresponding to the answer to the question in the piece of text based on the vector representation sequence.

Additional Description 3

An answer learning apparatus includes:
 a memory; and
 at least one processor connected to the memory,
 wherein the processor executes:
  receiving an input of training data including a piece of text divided into a plurality of spans that are subdivided units of the piece of text, a question, an answer type which is a correct answer corresponding to an answer to the question in the piece of text, an evidence range that is a range serving as evidence for the answer in the piece of text, and evidence information that is a span serving as evidence for the answer in the piece of text;
  transforming the piece of text divided into the plurality of spans and the question into a vector representation sequence representing a meaning of a span and the question using an encoding model for transforming input text into a vector representation sequence representing a meaning of the input text;
  estimating the evidence information using an extraction model that extracts the evidence information based on the vector representation sequence;
  estimating the evidence range using a search model that extracts the evidence range based on the vector representation sequence and the evidence information in the training data;
  determining an answer type for the question using a classification model that classifies the answer type for the question based on the vector representation sequence and the evidence information in the training data; and
  learning parameters of the encoding model, the extraction model, the search model, and the classification model such that the extracted evidence information and the evidence information in the training data match, the estimated evidence range and the evidence range in the training data match, and the classified answer type and the answer type in the training data match.

Additional Description 4

A non-transitory storage medium storing a computer-executable program for executing answer generation processing including:
 transforming a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text;
 estimating evidence information that is a span suitable as evidence for extracting the answer using a pre-trained extraction model that extracts the span suitable as the evidence for extracting the answer based on the vector representation sequence;

estimating an evidence range that is a range serving as evidence for the answer in the piece of text using a pre-trained search model that extracts the evidence range based on the vector representation sequence and the evidence information; and determining an answer type for the question using a pre-trained classification model that classifies an answer type which is a correct answer corresponding to the answer to the question in the piece of text based on the vector representation sequence and the evidence information.

Additional Description 5

A non-transitory storage medium storing a computer-executable program for executing answer generation processing including:

transforming a piece of text divided into a plurality of spans that are subdivided units of the piece of text and a question which have been input into a vector representation sequence representing a meaning of a span and the question based on the piece of text and the question which have been input using a pre-trained encoding model for transforming input text into a vector representation sequence representing a meaning of the input text; and estimating, for each of the spans, a evidence score indicating a degree to which the span is suitable as a evidence for extracting the answer using a pre-trained extraction model for calculating the evidence score based on the vector representation sequence, and the pre-trained encoding model and the pre-trained extraction model are pre-trained through multitask learning of a plurality of models including encoding and extraction models and further including:

a search model that extracts an evidence range that is a range serving as evidence for the answer in the piece of text based on the vector representation sequence produced through transformation using the encoding model; and a classification model that classifies an answer type which is a correct answer corresponding to the answer to the question in the piece of text based on the vector representation sequence.

Additional Description 6

A non-transitory storage medium storing a computer-executable program for executing answer learning processing including:

receiving an input of training data including a piece of text divided into a plurality of spans that are subdivided units of the piece of text, a question, an answer type which is a correct answer corresponding to an answer to the question in the piece of text, an evidence range that is a range serving as evidence for the answer in the piece of text, and evidence information that is a span serving as evidence for the answer in the piece of text;

transforming the piece of text divided into the plurality of spans and the question into a vector representation sequence representing a meaning of a span and the question using an encoding model for transforming input text into a vector representation sequence representing a meaning of the input text;

estimating the evidence information using an extraction model that extracts the evidence information based on the vector representation sequence;

estimating the evidence range using a search model that extracts the evidence range based on the vector representation sequence and the evidence information in the training data;

determining an answer type for the question using a classification model that classifies the answer type for the question based on the vector representation sequence and the evidence information in the training data; and learning parameters of the encoding model, the extraction model, the search model, and the classification model such that the extracted evidence information and the evidence information in the training data match, the estimated evidence range and the evidence range in the training data match, and the classified answer type and the answer type in the training data match.

REFERENCE SIGNS LIST

10, 30, 50 Answer learning apparatus
20, 40, 60 Answer generation apparatus
100 Input unit
200, 600, 900 Analysis unit
210, 610 Machine reading comprehension unit
211 Word encoding unit
213 First context encoding unit
214 Attention unit
215 Second context encoding unit
216 Evidence search unit
220 Classification unit
221 Input transformation unit
222 Score calculation unit
300, 700 Parameter learning unit
400 Input unit
500, 800 Output unit
617 Evidence extraction unit
910 Encoding unit

The invention claimed is:

1. An answer generation apparatus comprising:
a memory, and
at least one processor coupled to the memory,
the at least one processor being configured to:
receive a piece of text divided into a plurality of spans, wherein the plurality of spans represents subdivided units of the piece of text;
receive a question;
transform the piece of text and the question into a vector representation sequence, wherein the vector representation represents a meaning of a span of the plurality of spans and the question based on the piece of text and the question using a first machine learning model;
estimate evidence information using a second machine learning model, wherein the evidence information indicates the span of the plurality of spans suitable as evidence for extracting an answer to the question, and the second machine learning model extracts the span of the plurality of spans suitable as the evidence for extracting the answer based on the vector representation sequence;
estimate an evidence range using a third machine learning model, wherein the evidence range indicates a range of words in the span of the plurality of spans serving as evidence for the answer in the piece of text, and the third machine learning model extracts the evidence range based on the vector representation sequence and the evidence information;
classify an answer type for the question using a fourth machine learning model, wherein the fourth machine learning model classifies an answer type, and the answer type represents a correct answer of the answer to the question in the piece of text based on the vector representation sequence and the evidence information; and output a character string included in the evidence range obtained by the estimating of the evidence range as the answer to the question when the classified answer type is the extraction of the answer from the piece of text.

2. The answer generation apparatus according to claim 1, wherein the answer type is polarity of the answer to the question or extraction of the answer from the piece of text, and the processor further configured to output a character string included in the evidence range obtained by the estimating of the evidence range as the answer to the question when the classified answer type is the extraction of the answer from the piece of text.

3. An answer generation apparatus comprising:

a memory; and at least one processor coupled to the memory, the at least one processor being configured to:

receive a piece of text divided into a plurality of spans, wherein the plurality of spans represents subdivided units of the piece of text;

receive a question;

transform the piece of text and the question into a vector representation sequence, wherein the vector representation represents a meaning of a span of the plurality of spans and the question based on the piece of text and the question using a first machine learning model;

estimate, for each span of the plurality of spans, evidence score using a second machine learning model, wherein the evidence information indicates the span of the plurality of spans suitable as evidence for extracting an answer to the question, and the second machine learning model calculates the evidence score based on the vector representation sequence, wherein the first machine learning model and the second machine learning model are pre-trained through multitask learning of a plurality of models comprising the first machine learning model and the second machine learning model, and the plurality of models further comprises:

a first model, the first model extracts an evidence range that is a range serving as evidence for the answer in the piece of text based on the vector representation sequence produced through transformation using the encoding model, a second model, and the second model classifies an answer type which is a correct answer corresponding to the answer to the question in the piece of text based on the vector representation sequence; and output a character string included in the evidence range obtained by the estimating of the evidence range as the answer to the question when the classified answer type is the extraction of the answer from the piece of text.

4. An answer learning apparatus comprising:

a memory; and at least one processor coupled to the memory, the at least one processor being configured to:

receive an input of training data, wherein the training data comprises a piece of text divided into a plurality of spans that are subdivided units of the piece of text, a question, an answer type which is a correct answer corresponding to an answer to the question in the piece of text, evidence range that is a range serving as evidence for the answer in the piece of text, and evidence information that is a span of the plurality of spans serving as evidence for the answer in the piece of text;

transform the piece of text divided into the plurality of spans and the question into a vector representation sequence using a first machine learning model, wherein the vector representation sequence represents a meaning of the span of the plurality of spans and the question;

estimate the evidence information using a second machine learning model, wherein the second machine learning model extracts the evidence information based on the vector representation sequence;

estimate the evidence range using a third machine learning model, wherein the third machine learning model extracts the evidence range based on the vector representation sequence and the evidence information in the training data;

classify an answer type for the question using a fourth machine learning model, wherein the fourth machine learning model classifies the answer type for the question based on the vector representation sequence and the evidence information in the training data;

learn parameters of the first machine learning model, the second machine learning model, the third machine learning model, and the fourth machine learning model such that the extracted evidence information and the evidence information in the training data match, the estimated evidence range and the evidence range in the training data match, and the classified answer type and the answer type in the training data match; and output a character string included in the evidence range obtained by the estimating of the evidence range as the answer to the question when the classified answer type is the extraction of the answer from the piece of text.

* * * * *